(12) United States Patent
Ladde et al.

(10) Patent No.: US 7,562,062 B2
(45) Date of Patent: Jul. 14, 2009

(54) FORECASTING SYSTEM TOOL

(75) Inventors: Cedric Ladde, London (GB); Anargyros Garyfalos, Ipswich (GB)

(73) Assignee: British Telecommunications plc, London (GB)

( * ) Notice: Subject to any disclaimer, the term of this patent is extended or adjusted under 35 U.S.C. 154(b) by 427 days.

(21) Appl. No.: 11/387,046

(22) Filed: Mar. 23, 2006

(65) Prior Publication Data
US 2006/0247859 A1 Nov. 2, 2006

(30) Foreign Application Priority Data
Mar. 31, 2005 (EP) .................................. 05252022

(51) Int. Cl.
G06F 17/00 (2006.01)
G06N 5/02 (2006.01)
(52) U.S. Cl. ............................ 706/47; 706/12; 706/13
(58) Field of Classification Search ................... None
See application file for complete search history.

(56) References Cited

U.S. PATENT DOCUMENTS

| 7,340,060 | B2 * | 3/2008 | Tomkins et al. | 380/277 |
|---|---|---|---|---|
| 2002/0107819 | A1 * | 8/2002 | Ouimet | 705/400 |
| 2002/0133385 | A1 | 9/2002 | Fox et al. | |
| 2002/0169657 | A1 * | 11/2002 | Singh et al. | 705/10 |
| 2004/0117333 | A1 * | 6/2004 | Voudouris et al. | 706/13 |
| 2008/0215386 | A1 * | 9/2008 | Eder | 705/7 |

OTHER PUBLICATIONS

Liu, L. et al, "Data Mining of Time-Series: an Illustration using Fast-Food Restaurant Franchise Data," abstract, http://tigger.uic.edu/~slsclove/abstdmts.htm.

Chatfield, C., "Time-Series Forecasting," pp. 1-2, Chapman & Hall, 2001, ISBN 1-58488-063-5.

Raphaël Dorne and Christos Voudouris, "HSF: The iOpt's framework to easily design Meta-Heuristic methods," Kluwer Academic Publishers, Netherlands, 2003.

R. Dorne, C. Voudouris, A. Liret, C. Ladde, D. Lesaint, "iSchedule—and optimisation tool-kit based on heuristic search to solve BT scheduling problems," BT Technology Journal, vol. 21, No. 4, Oct. 2003, p. 50 to 58.

Christos Voudouris, Raphael Dorne, David Lesaint, and Anne Liret, "iOpt: A Software Toolkit for Heuristic Search Methods," Lecture Notes in Computer Science, Springer Berlin / Heidelberg, 0302-9743 (Print) 1611-3349 (Online), vol. 2239/2001, 2001, pp. 716-729.

* cited by examiner

*Primary Examiner*—Joseph P Hirl
(74) *Attorney, Agent, or Firm*—Nixon & Vanderhye PC

(57) ABSTRACT

A forecasting engine arranged to generate a forecast for a set of historic time-series data. The engine includes one or more one or more generically structured core algorithmic components providing a core function in a forecasting heuristic algorithm, and one or more generically structured optional algorithmic components providing an optional function in the forecasting heuristic algorithm. Each algorithmic component is individually tuned in a predetermined sequence, and the first algorithmic component in the sequence performs a tuning process on the set of historic time-series data. Subsequently, algorithmic components are tuned using time-series data conditioned by all of the tuning processes previously performed in the predetermined sequence. The entire sequence of algorithmic components is arranged to collectively provide conditioned data which is used to generate a forecast.

12 Claims, 26 Drawing Sheets

FORECASTING SYSTEM TOOL

FIELD OF TECHNOLOGY

The present invention relates to a forecasting system development tool and to related aspects. In particular, but not exclusively, the invention relates to a forecasting system which uses a methodology which combines multiple forecasting techniques together to provide a more robust and accurate forecasting engine.

BACKGROUND

The term "time-series" is used herein to refer to data representing a collection of observations made sequentially through time. Time-series forecasting is a method of computing forecasts based on present and past values of a time-series. The complexity of this process can range from something simple (like an average of the past two historic values) to more advanced mathematical concepts.

Time-series forecasts can be provided for many physical systems, particularly complex non-linear systems whose behaviour is difficult to predict using other methods. For example, time-series data may be collected from test data and used to predict future behaviour, for example, in the field of material science to determine when a particular part of a device when be subject to failure (e.g. from metal fatigue).

Whilst future behaviour may be mathematically modelled for simple systems and structures, for more complicated devices the use of time-series test data together with an appropriate forecasting engine can produce more accurate results and can produce results more rapidly than other methods. Accurate prediction of device failure is particularly important in industries such as the aeronautical and automobile industry, where device failure can have catastrophic consequences. A time-series forecast system may have to generate results rapidly as the data set on which the system works evolves, and the system itself may require modification to take into account changes in the historic data set over time. Such dynamic forecasting systems need to be designed in such a way that they can rapidly adapt to the characteristics of the data set for which they are generating results.

Time-series forecasting is also used in many other fields, ranging from weather prediction to predictions of system performance for complex systems such as might occur in agriculture or astronomy. Financial and business focussed time-series data are also collected for analysis purposes. Examples of such time-series include data representing sales of a particular product in successive months, and data representing work demand volumes over a number of days.

Time-series forecasting is becoming increasingly important for a variety of industries, enabling important resources such as component and product stores as well as the workforce of a company to be managed more efficiently. Such systems are frequently very complex and cannot be effectively modelled using manual techniques if accurate results are to be obtained in a given amount of time.

The wide variety of potential scenarios for which time-series forecasting is required has resulted in a demand for time-series forecast applications to be customised for specific requirements. More information on the general field of time-series forecasting can be found in "Time-Series Forecasting", by C. Chatfield, pp 1-2, Chapman & Hall, 2000, ISBN 1-58488-063-5.

To predict future behaviour in any system, data is first collected in a "raw" or unprocessed form. Whilst simple forecast systems may generate forecasts based on the raw data collected, more sophisticated forecasting engines can receive data from a number of sources, and may need to "groom" the data to a standard form (for example, by normalising the data) prior to the data being processed by the forecasting system's algorithm(s). Further levels of sophistication can be incorporated by aggregating/de-aggregating the raw data etc, and in the choice and number of parameter values forming the time series.

Analysis of any complex system (whether physical or not) by a forecast system designer may require the designer to construct a suitable problem space comprising several parameters, which may have quite complex interrelationships, and time-series data is then acquired comprising a series of values for one or more selected parameters. A suitable forecasting system must then be constructed to determine characteristics of the data set which influence its future behaviour, i.e., to predict the value or values of one or more of the parameters forming the historic data set on which the forecasting system operates.

Customising a time-series forecasting system so that it is able to provide forecasts for specific requirements is a complex, costly task which can involve considerable reconfiguration of the forecasting system to determine which forecast algorithm(s) generate the most accurate results. A forecast system designer needs to reconfigure conventional forecasting systems each time additional parameters are introduced or deleted from the time-series data used by the forecast model of the forecast system.

As an example, consider the case where a forecast is required in order to ensure appropriate human resources are available for a company to fulfil its likely work requirements. In order to produce accurate forecasts, any model of the system must represent the critical features of the system. This results in a complex model comprising numerous parameters, such as geographic area, type of work etc. In such complex systems, the forecast designer must often proceed to some extent by trial and error to determine what parameters are critical to the system and to then determine what their relationship and relative weights are etc. to construct the rule set for the forecasting heuristic, which provides logic for coordinating the use of any forecast algorithms. In many scenarios, a large number of potential forecasting parameters exist which cause problems as it may not be clear when the forecasting tool is being developed which parameters (e.g., location, type of task etc.) are required to ensure the forecast is satisfactorily accurate.

U.S. patent application Ser. No. US2002/0133385A1, entitled "Method and computer program product for weather adapter consumer event planning", by F. Fox, D. Pearson et al., describes a system for forecasting future retail performance in which a basic architecture consisting of an analyser and a configurator selects the specific parameters to be forecast over. However, if the parameters used in the model change, e.g., if instead of examining historical data comprising a time-series associated with a particular type of location for job (a location parameter), the data comprises time-series data relating to the time it takes to perform a job (a duration parameter), or if a location parameter "town" were changed to a location parameter for "street", the configurator itself will have to be modified accordingly, in addition to the required database changes.

Similarly, in U.S. patent application Ser. No. US 2002/0169657A1 entitled "Supply chain demand system and forecasting", by N. Singh, S. Olasky et all., a forecasting system is described which supports multi-scenario comparisons. Singh et al define how multiple algorithms may be compared and not how they are defined, their system uses different algorithms for different scenarios and does not deal with parameters in a generic and extensible way.

The invention seeks to obviate or mitigate one or more limitations and problems known in the art associated with the development of a forecasting system.

This invention seeks to facilitate the task of generating a forecasting system by providing a forecasting tool for developers of forecasting systems.

SUMMARY STATEMENTS OF THE INVENTION

One aspect of the invention seeks to provide a method of generating a forecast system using a forecast system development tool, the method comprising: selecting one or more generically structured core forecast algorithm components, each providing a non-optional function for a forecast heuristic component; and optionally, selecting one or more optional forecast algorithm components, each component providing an optional function for said forecasting heuristic algorithm, the method further comprising the steps of: associating each selected component with a framework whose structure determines the relationship between said component, associating each selected component with a set of one or more rules provided by said forecast heuristic component, whereby each forecast algorithm component provides an algorithm which is individually tuned in a predetermined sequence determined by said framework, the first forecast algorithm component in said sequence performing a tuning process on said set of time-series data and wherein subsequent forecast algorithm components are tuned using time-series data conditioned by all of the tuning processes previously performed in said predetermined sequence, whereby collectively, the sequence of forecast algorithm components determined by the framework and said heuristic forecast component forms said forecast system.

In one embodiment, the method further comprises the step of:

selecting a forecasting technique which pre-determines said forecast heuristic and said framework.

Another aspect of the invention relates to a forecast system development tool arranged to implement the method aspects of the invention. One embodiment of a development tool comprises:

a user interface and associated processing apparatus arranged to enable a user to select one or more generically structured core forecast algorithm components from a range of components, each component providing a non-optional function for a forecast heuristic component; and arranged to enable a user to further select one or more optional forecast algorithm components, each component providing an optional function for said forecasting heuristic algorithm, the user interface being further arranged to enable a user to associate selected components with a framework whose structure determines the relationship between said components and to enable a user to associate each selected component with a set of one or more rules provided by said forecast heuristic component, whereby each forecast algorithm component provides an algorithm which is individually tuned in a predetermined sequence determined by said framework, the first forecast algorithm component in said sequence performing a tuning process on said set of time-series data and wherein subsequent forecast algorithm components are tuned using time-series data conditioned by all of the tuning processes previously performed in said predetermined sequence, whereby, collectively, the sequence of selected forecast algorithm components determined by the framework and said heuristic forecast component forms said forecast system.

In one embodiment, the user interface is further arranged to enable a user to select a forecasting technique which pre-determines said forecast heuristic and said framework.

Another aspect of the invention provides a forecasting engine arranged to generate a forecast for a set of time-series data, the engine comprising: one or more generically structured core algorithmic components, each providing a non-optional function in a forecasting heuristic algorithm; and one or more generically structured optional algorithmic components, each providing an optional function in the forecasting heuristic algorithm, wherein each of said core and optional algorithmic components is individually tuned in a predetermined sequence, the first algorithmic component in said sequence performing a tuning process on said set of time-series data and wherein subsequent algorithmic components are tuned using time-series data conditioned by all of the tuning processes previously performed in said predetermined sequence, wherein the entire sequence of algorithmic components is arranged to collectively provide conditioned data which is used to generate a forecast.

In one embodiment, said core generic algorithmic components provide a forecasting heuristic.

In one embodiment, said core generic algorithmic components provide a forecasting heuristic and wherein said forecasting heuristic defines said predetermined sequence.

In one embodiment, said core generic algorithmic components provide a forecasting heuristic and wherein said forecasting heuristic determines a level of aggregation for the time-series data, and wherein said forecasting engine generates the forecast at said level of aggregation.

In one embodiment, said core generic algorithmic components provide a forecasting heuristic and wherein said forecasting heuristic determines a level of aggregation for the time-series data, and wherein said forecasting engine generates the forecast at said level of aggregation and wherein said forecast engine receives said time-series data encapsulated within a generic forecast-data-type.

In one embodiment, a said optional generic component comprises a correct algorithm.

In one embodiment, a said optional generic component comprises an adjust algorithm.

In one embodiment, said core generic algorithmic components provide a forecasting heuristic and wherein said forecasting heuristic defines a framework for incorporating the algorithmic components of said forecasting engine.

Another aspect of the invention seeks to provide a forecasting system comprising: a forecasting engine arranged to generate a forecast for a set of time-series data, the engine comprising: one or more generically structured core algorithmic components, each providing a non-optional function in a forecasting heuristic algorithm; and one or more generically structured optional algorithmic components, each providing an optional function in the forecasting heuristic algorithm, wherein each of said core and optional algorithmic components is individually tuned in a predetermined sequence, the first algorithmic component in said sequence performing a tuning process on said set of time-series data and wherein subsequent algorithmic components are tuned using time-series data conditioned by all of the tuning processes previously performed in said predetermined sequence, wherein the entire sequence of algorithmic components is arranged to collectively provide conditioned data which is used to generate a forecast; means to aggregate data derived from said time-series data; and means to provide said aggregated data to said forecasting engine, and wherein said forecasting engine is arranged to generate a forecast for said aggregated data.

Another aspect of the invention seeks to provide a forecasting system comprising a plurality of forecasting components of different type, wherein each component in the system is arranged to perform a self-tuning process in a predetermined sequence and whereby the forecast generated by the forecasting system is generated using the aggregated tuned components of the forecast system.

Another aspect of the invention seeks to provide a computer program arranged to generate a forecast for a time-series data set, said computer program comprising a plurality of forecasting algorithmic components, each forecasting algorithmic component to be incorporated into a predetermined framework and capable of influencing the forecast generated, wherein said plurality of forecasting components is added to the forecasting system in a predetermined order defined by the framework, and wherein said forecasting components collectively generated a forecast for said historic time-series data.

Another aspect of the invention seeks to provide design tool for a forecasting system, the design tool comprising: a display of a forecasting framework, wherein the display comprises a region for a visual representation of the framework and a plurality of regions, each arranged to provide a visual display of a type of algorithmic component capable of being incorporated into the displayed framework; means arranged to enable a user of said design tool to include one or more algorithmic components into said forecasting framework to generate a forecast for a time-series data set by causing said a visual representation of said one or more algorithmic components to be graphically attached to the displayed representation of forecasting framework.

In one embodiment, the algorithmic components are logically associated by the order in which they are graphically attached to the displayed representation of the forecasting framework.

In one embodiment, the algorithmic components are logically associated by the order in which they are graphically attached to the displayed representation of the forecasting framework and wherein the order of the algorithmic components indicates the sequence in which the algorithmic components are tuned.

In one embodiment, the forecasting system comprises a forecasting engine arranged to generate a forecast for a set of time-series data, the engine comprising: one or more generically structured core algorithmic components, each providing a non-optional function in a forecasting heuristic algorithm; and one or more generically structured optional algorithmic components, each providing an optional function in the forecasting heuristic algorithm, wherein each algorithmic component is individually tuned in a predetermined sequence, the first algorithmic component in said sequence performing a tuning process on said set of time-series data and wherein subsequent algorithmic components are tuned using time-series data conditioned by all of the tuning processes previously performed in said predetermined sequence, wherein the entire sequence of algorithmic components is arranged to collectively provide conditioned data which is used to generate a forecast, and wherein said design tool further comprises means to interface with said forecasting engine, to associate the visual representation of the framework and the visual representations of the algorithmic components of the design tool with the framework and algorithmic components of the forecasting system, and wherein said design tool further comprises means to inititate the generation of a forecast on said time-series data using said forecasting system.

Another aspect of the invention seeks to provide a computer program arranged in use to provide functionality implementing a forecasting engine, the forecasting engine being arranged to generate a forecast for a set of time-series data, the forecasting engine including: one or more generically structured core algorithmic components, each providing a non-optional function in a forecasting heuristic algorithm; and one or more generically structured optional algorithmic components, each providing an optional function in the forecasting heuristic algorithm, wherein each algorithmic component is individually tuned in a predetermined sequence, the first algorithmic component in said sequence performing a tuning process on said set of time-series data and wherein subsequent algorithmic components are tuned using time-series data conditioned by all of the tuning processes previously performed in said predetermined sequence, wherein the entire sequence of algorithmic components is arranged to collectively provide conditioned data which is used to generate a forecast.

Another aspect of the invention seeks to provide apparatus arranged in use to support deployment of a computer program as claimed in any previous aspect.

The preferred features as set out in the dependent claims/embodiments of the invention may be suitably combined with any of the above aspects/independent claims in any appropriate manner apparent to those skilled in the art.

BRIEF DESCRIPTION OF DRAWINGS

Preferred embodiments of the invention will now be described, by way of example only, with reference to the accompanying drawings in which.

DETAILED DISCRIPTION

The best mode of the invention as currently contemplated by the inventors will now be described with reference to the accompanying drawings. It will be apparent to those of ordinary skill in the art, however, that the description of the invention is by way of example only, and that the invention is not intended to be limited only to the embodiments described. Where those of ordinary skill in the art are aware the embodiments of the invention described below contain features which can be modified or replaced by functional equivalents, the description is intended to implicitly include such alternatives to the given features of the invention (unless specifically excluded).

Figure 1A:
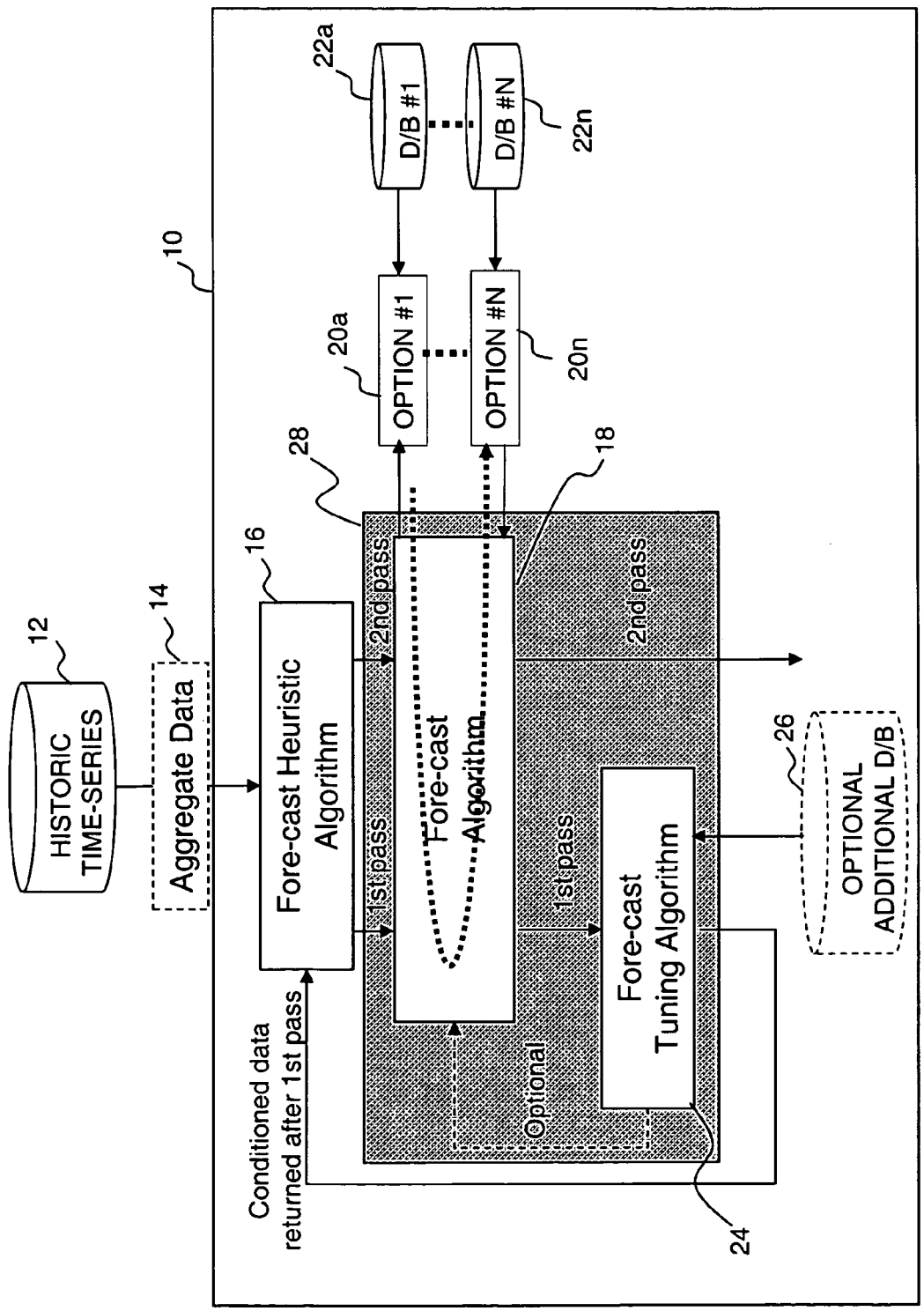
FIG. 1A shows schematically a forecasting system according to one embodiment of the invention.

FIG. 1A of the accompanying drawings shows schematically a forecast system which can be constructed using an embodiment of the forecast system development tool according to the invention. The forecast system development tool provides means to enable a person relatively unskilled in the art of developing forecasting systems to generate a forecast system using one or more forecast heuristic components which provide logic governing the use of one or more forecast algorithm components.

A forecast heuristic determines whether a forecast algorithm is used and to what part of the time-series data the forecast algorithm is applied. A forecast algorithm encapsulates a mathematical formula which operates on the time-series data. In contrast, a forecast heuristic contains the "logic" to co-ordinate use of forecast algorithms. The logic can range from a simple rule (for example, "run forecast algorithm A when parameter x has a value less than 10, and run forecast algorithm B otherwise") to far more sophisticated rules encompassing a plurality of parameters and conditional factors.

For example, more complex heuristic programming can uses a rule set comprising one or more self-learning rules to solve a problem. Such heuristic programs can be self-learning in that the rule set on which they are based evolves either by the composition of one or more rules changing, for example, the parameter values changing (e.g., in terms of the simplistic example given above, change the criteria for running forecast algorithm A to when parameter x has a value less than 5, and run algorithm B otherwise) or by a change in the rules forming the rule set (e.g., adding a rule so that "forecasting algorithm C is run when parameter y is more than 20"). A forecast heuristic program which has a self-learning ability should ideally adapt its rule-set to generate forecast results that maintain improve in their accuracy over time.

The forecast system development tool comprises a forecast framework in which different forecasting techniques are componentised as forecast algorithm components and the rules which govern how a forecast algorithm is used by the system are provided by one or more forecast heuristic components. This enables forecast systems to be constructed in a modular manner with the unskilled user being guided by the forecast framework as to what modules to select.

To enable forecast algorithm components and forecast heuristic components to be assembled using a framework, communications protocols governing the manner of communication between components are provided by the invention. A protocol of communication is provided to enable each category of forecast component to work appropriately within the framework. Communication protocols are also established to enable more than one type of forecast algorithm component to be incorporated into a framework for a forecast heuristic. Such communication protocols also allows the order (of selection and/or operation) of any combination of forecast components to affect the operation of a forecast heuristic.

The forecast system provides what is known in the art as forecast engine, for example, rather than a single (simpler) forecasting technique (for example, such as the Auto-Regressive Integrated Moving Average (ARIMA) scheme which is well known to those skilled in the art). As such, the term forecast heuristic (or equivalently "ForecastHeuristic") is defined herein to comprise one or more forecast algorithm ("ForecastAlgorithm") components which collectively provide a forecast based on statistical evidence/analytical reasoning using historical time-series data together with rules governing the use of said forecast algorithm components.

FIG. 1 A of the accompanying drawings shows schematically a forecast engine 10 (see FIG. 1A of the accompanying drawings) constructed from a plurality of forecast algorithm components. Rules determining how the forecast algorithm components are to operate used are provided by a forecast heuristic (which may in some embodiments of the invention comprise a composite heuristic, i.e., a plurality of modular forecast heuristic components may be used by the forecast engine). The forecast engine (comprising one or more forecast heuristic components) is constructed by a forecast developer (i.e., a user of the forecast system development tool) using a framework provided by the forecast engine.

The forecast system development tool enables a user to select a number of forecast algorithm components from a range and associate the selected forecast algorithm components with one or more forecast heuristic components using a framework so as to construct a forecast engine 10. The rules provided by the forecast heuristic(s) of the forecast engine 10 are thus able to combine different forecasting techniques together to provide a customised forecast which the user of the forecast system development tool can easily adjust using the development tool by de-/selection of the forecast algorithm components associated with any forecast heuristic and also by de-/selection of a forecast heuristic component or by adjustment of a rule-set of a forecast heuristic.

As shown schematically in FIG. 1A of the accompanying drawings, the forecast engine 10 is arranged to receive and process one or more time-series data sets, a data set comprising data which has been sampled at some previous time, for example, periodically in time from data store 12.

Various pre-processing (also known as "grooming") of the stored data may be performed prior to the groomed data being processed by the forecast engine. For example, the time-series data may be extracted from the data store either in a particular format or re-formatted, and may be encapsulated and/or aggregated where appropriate so that some of the computational complexity of the forecast algorithm components comprising the forecast engine can be reduced. A mechanism for providing data to the Forecast Engine 10 using a generic forecast data type (FDT), is described in the inventors' co-pending British patent application GB-A-0502494.

If data is groomed prior to being operated upon by the forecast engine, it facilitates re-using the same forecast heuristic algorithm for various data-sets, even if the parameters used in each data-set change. Moreover, the forecast engine can perform a variety of forecasting techniques on the same data set. The aggregation of data, i.e., the provision of data which has been collated from the data set prior to being provided to the forecast engine 10 is, however, optional. This optional element is shown in FIG. 1A by the dashed lines around the aggregate data item 14.

As shown in FIG. 1A, the forecast engine 10 has a hierarchical forecast framework structure. Associated by the framework are a number of core components and optional components. All components are provided in a generic form, enabling a forecast engine to be constructed in a modular manner. A forecast algorithm component can be either core (i.e., non-optional or essential) or optional for a particular forecast heuristic component. In this way, a forecast engine 10 comprises one or more forecast heuristics, each associated with a number of core I and optional forecast algorithm components.

The forecast engine 10 shown in FIG. 1A comprises a forecast heuristic component 16 which determines the logic associating various forecast algorithm components of the engine for a particular forecast. The forecast heuristic logic comprises rules which govern, for example, the level of aggregation and how to aggregate the data over which a forecast is to be obtained. For example, in embodiments of the invention using the FDT, the aggregation is determined by the FDT hierarchy. Thus, the forecast heuristic component 16 forms part of the architectural meta framework arranged to co-ordinate the entire forecasting processes performed by the core forecast algorithm components and selected optional forecast algorithm components.

The forecast engine 10 is designed such that its forecast heuristic 16 comprises a ForecastHeuristic class logically associating one or more instantiations of a ForecastAlgorithm class (including at least one core forecast algorithm and optionally, one or more optional forecast algorithms). The number of instantiations (known as "children" of the parent class to those of skill in the art) is dependent on the implementation requirements of a specific embodiment of a forecast system according to the invention.

In a forecast meta framework according to the invention, the heuristic forecast component 16 provides time-series data at a predetermined level of aggregation to a framework comprising one or more core components (which may comprise one or more forecast heuristic components 16 and forecast algorithm components 18) and zero or more optional forecast algorithm components 20a . . . 20n. Examples of optional forecast components are components which operate to adjust and/or correct the time-series data used to generate the forecast.

An example of an optional forecast algorithm component which adjusts a time-series data set is one which removes trend effects, such as, for example, an adjust algorithm for weather-related effects on the time-series, an embodiment of which "Weather AdjustAlgorithm" is described in more detail later hereinbelow. One embodiment of an optional forecast algorithm component which modifies a time-series data set to remove certain data is a correct forecast algorithm component, such as the BankHolidays component described later hereinbelow. These optional components are incorporated into the forecast engine 10 using the framework in a specific predetermined order for the specific forecasting technique to be implemented using a forecast heuristic component 16.

As shown in FIG. 1A, the forecast engine 10 comprises a forecast algorithm 28 associated with forecast heuristic 16. Forecast algorithm 28 comprises a core forecasting algorithm 18 associated with a generic tuning component 24, and optional forecast algorithm components 20a . . . 20n and optional tuning component 26.

Optional forecast components 20a, 20n may require additional data which is derived from one or more shared or individual data stores, for example, databases 22a, 22n.

Examples of optional forecast components 20a, 20n include an optional correct forecast algorithm and an optional adjust forecast algorithm. The optional forecast algorithm components 20a . . . 20n and optional tuning component 26 are implemented only as part of the first pass of data through the forecasting engine (there is no need to retune again after conditioned data has been returned by the tuning algorithm 24).

An example of a core forecast algorithm used by one embodiment of the invention is the Automated-Regressive Integrated Moving Average (ARIMA) algorithm. ARIMA is the forecast algorithm used in the application resource management system (ARMS) embodiment of the invention. ARMS is a web-based Project Management Tool for managing complex tasks across multiple teams/locations, and is described in more detail in the following documents: Owusu G. et. al. (2003) "ARMS—application of AI and OR methods to resource management", BT Technology Journal, Vol 21, No 4, pp. 27-32; Virginas B, Voudouris C., Owusu G., and Anim-Ansah G. (2003) "ARMS Collaborator—intelligent agents using market to organise resourcing in modern enterprises", BT Technology Journal, Vol 21, No 4, pp. 59-64; Virginas B., Owusu G., Voudouris C., and Anim-Ansah G. (2003) "A Two Stage Optimisation System for Resource Management in BT, Applications and Innovations in Intelligent Systems XI",—Proceedings of AI 2003, pp. 109-121; Voudouris C., Owusu G., Dome R., Ladde, C., and Virginas B. (2003) "ARMS: An Automated Resource Management System for British Telecommunications plc.", Abstract Book: EURO/INFORMS 2003 pp. 165; Owusu G., Dome R., Voudouris C., and Lesaint D. (2002) "Dynamic Planner: A decision support tool for resource planning, Applications and Innovations in Intelligent Systems X",—Proceedings of ES 2002, pp. 19-31; Owusu G., Voudouris C., Dome R., and Lesaint D. (2002) "Developing a profiler in the arms platform", Proceedings of the Sixth IASTED International Conference on Artificial Intelligence and Soft Computing., pp. 541-546; and Owusu G., Voudouris C., Dome R., and Lesaint D. (2002) "Using preferences to optimise resource profiles", Proceedings of XV Conference of the European Chapter on Combinatorial Optimisation.

In the forecasting engine shown in FIG. 1A, data is passed from the historic data store 12 either in its native state or encapsulated in an aggregate form to the forecast heuristic component 16. The forecast heuristic component processes the received data and passes the data to forecast algorithm 28 in a first pass. The data passes to a part of the core forecast algorithm component 18 which calls on a sequence of optional forecast algorithm component processes 20a, . . . ,20n incorporated into the forecast algorithm 28 to modify the core forecast algorithm 18 so that it operates on the data using the predetermined forecasting technique set out by the forecast heuristic 16.

As part of the forecast process, the forecast tuning algorithm component 24 tunes the forecast data, by configuring the parameters of the forecast algorithms provided by the core and non-core (optional) forecast components. Depending on the specific forecast algorithm used, the tuning process may require further data to be retrieved from data store 26 or from one or more of the other data stores.

The tuning algorithm component 24 returns its output to the core forecast algorithm component 18, so that the data output by the tuning process is appropriately conditioned and can be used by main forecast algorithm 28 to generate a forecast in the 2nd pass. The tuning operation of the forecast algorithm core component 18 does not modify the parameters of any other forecast algorithm components 20*a* . . . 20*n*. After the after the parameters of the core forecast algorithm component 18 have been configured), the forecasting algorithm 28 tunes the optional forecasting components 20*a* . . . 20*n*. Each optional forecast component 20*a* . . . 20*n* is individually tuned to update the parameter values stored in data stores 22*a* . . . 22*n* which are used by that respective optional forecast algorithm component.

A forecasting technique is represented by a forecasting engine according to the invention by generic core algorithmic components (at least one forecasting heuristic algorithm and at least one forecast algorithm), and by non-core, i.e., optional components (for example, one or more correct algorithms, and/or one or more adjust algorithms) which may or may not be generic. (In addition, there may be other optional algorithmic components which characterise a specific forecasting technique.) By associating different forecast components together a forecast engine can be constructed by a user. To aid the user, a framework is provided and forecast component are provided in a modular form which enables each component to be attached to the framework. The framework determines the sequence of operation of each module which can affect the results the forecast engine provides.

By providing forecast algorithm components in a generic modular form for use with a variety of different forecast heuristics/data sets/frameworks etc, different forecast engines can reuse the generic components that they have in common.

Figure 2:
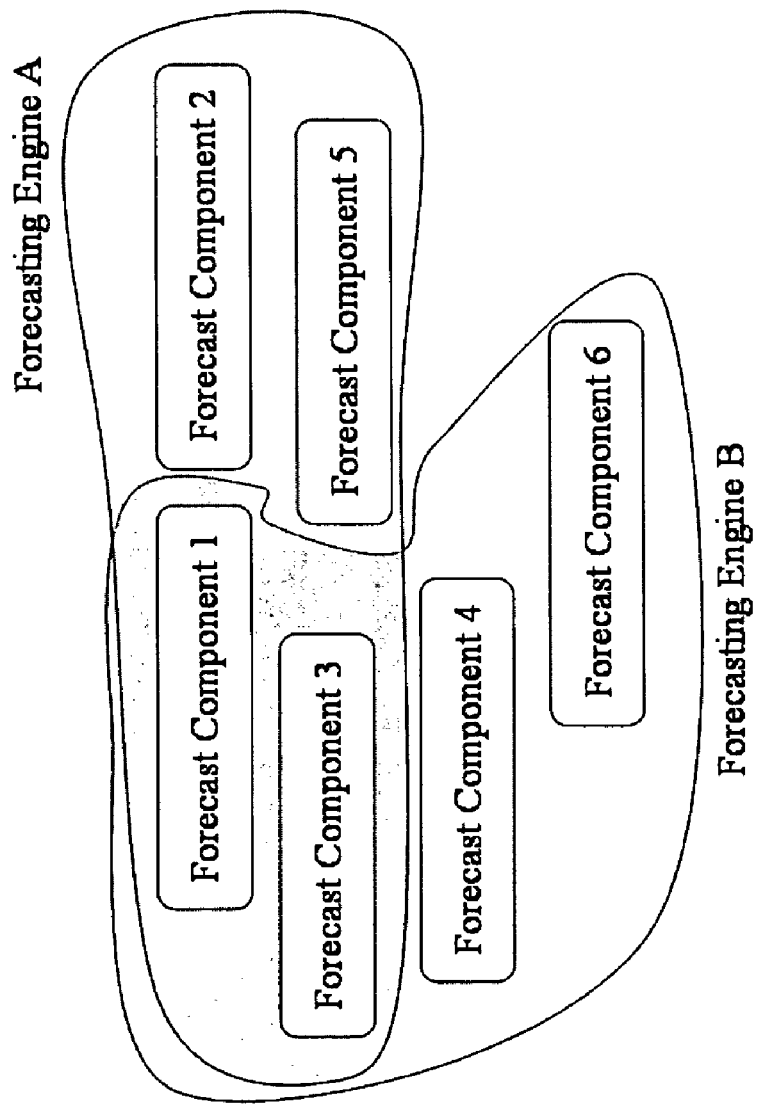
FIG. 2 shows an embodiment of the invention in which two forecasting engines A and B share two components.

This is shown schematically in FIG. 2, where forecast components 1 and 3 are generic to both forecast engines A and B. Forecast engine A further incorporates non-generic components 2 and 5 which will characterise the specific forecasting technique for engine A. Forecast engine B further comprises non-generic components 4 and 6 which will characterise the specific forecasting technique used by engine B.

Figure 1B:
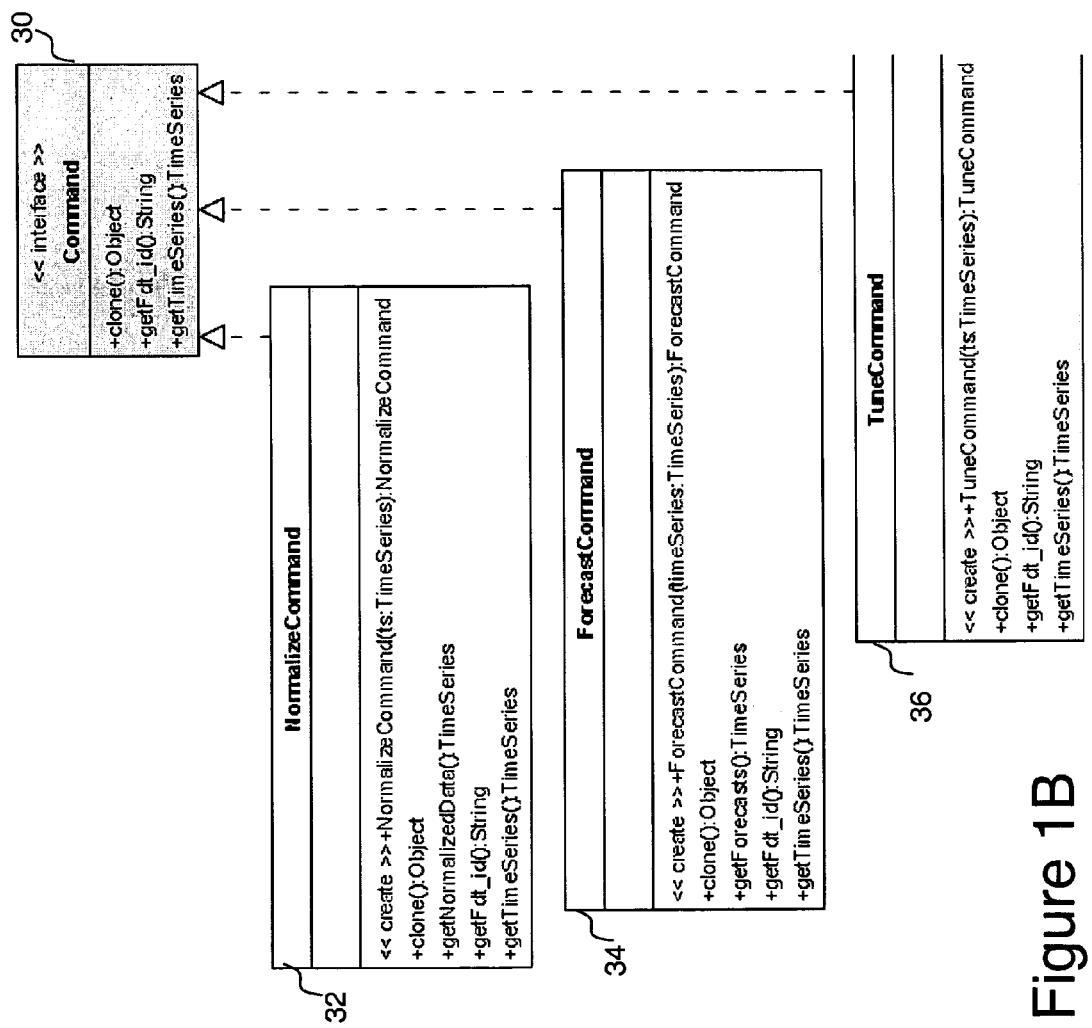
FIG. 1B shows a class diagram of an embodiment of the invention.

A class diagram for a forecast engine according to one embodiment of the invention is shown in FIG. 1B. The class diagram for the forecast engine comprises a plurality of objects, including a normalise command object 32, a forecast command object 32 and a tune command object 34. The command object 30 arranged to interface with other parts of the forecast engine 10 system (not shown) is arranged to receive input respectively from a normalise command object 32, a forecast command object 34 and a tune command object 36, which are described in more detail later hereinbelow.

Each of the three command objects comprise generic core components for a forecast engine according to an embodiment of the invention.

The tune command component provides a tune action in which given an input time series of sufficient length, the component will compute a set of parameters necessary for the forecast to be generated;

The forecast command component provides a forecast action in which given an input time series of sufficient length and a set of tuned parameters, the component will produce complete or partial forecasts under the form of an output time series; and The normalise command component provides a normalise action in which given an input time series of sufficient length and a set of tuned parameters, the component will be able to output a normalised time series.

The three actions define the vocabulary the different forecast components use to communicate with each other.

A forecast algorithm component depends on a series of parameters that control how that component models the time series. The parameters are computed using historical data. The parameters are conditioned by tuning (implemented using the core tune command component).Each forecast algorithm component must follow a particular protocol when tuning, which is described in more detail hereinbelow. This protocol allows the tuning of the multiple components composing the forecast engine so that the final results generated are more accurate.

The tune command component 36 comprises a continuous series of points in time (for example, time periods (Day, Month . . . )), which represent the duration/historical period of the data to be used for tuning. Each time period is associated to the "Unknown" value at first which is then modified according to each algorithms contribution to the forecasts. Each forecast algorithm component uses the "tuned" forecasts (i.e., the conditioned data) from the last component to tune itself (which would be stored either in the historical data store 12 or a specific data store 26 as shown in FIG. 1A). The historical data is available to any of the forecast components by default.

Once tuned, the forecast components work collectively to produce a forecast for the historical time-series data held in data store 12 (shown in FIG. 1). For example, if the forecast command component 34 comprises a continuous series of time periods (Day, Month . . . ) representing the period to forecast, each time period is associated with an "Unknown" value at first which is then modified according to each algorithm's contribution to the forecasts. The time series contained by the forecast command component 34 thus represents the data forecast by the last execution of the calling forecast algorithm.

The normalize command component 32 is an internal command used by forecast command component 34 and the tune command component 36. The normalize command component 32 normalises data before the data is used by a forecasting algorithm. The normalise command component processes data so that the actual data value at time t is equal to the forecasted value for time t plus a remaining value Z as given by:

$$\text{Historical}(\text{Time } t) = \text{ForecastingModel}(\text{Input Time Series, Parameters, Time } t) + Z$$

Those of ordinary skill in the art will realise that a good forecasting model is one that produces a Z function equal to a white noise and will have a normalize command component normalising a time series (Historical) which will output Z as defined above. In other words, the normalize command component removes the effects of its model on the time series, leaving to other components the task to get Z as close to a white noise as possible.

The forecast heuristic component 16 represents the top level component of a forecasting engine according to the best mode of the invention currently envisaged by the inventors.

In one embodiment of the invention, the time-series data is provided using a generic forecast data type (FDT), such as is described in the inventors copending British patent application GB-A-0502494. The FDT can encapsulate certain characteristics of the historical time-series data. The forecast heuristic has visibility on the FDT structure and decides how to aggregate/de-aggregate the data the FDT encapsulates. For instance, the forecast heuristic can enhance a forecast by aggregating data in a way that reduces the overall noise (the value of Z above). The forecast heuristic is the only component which has visibility over the entire FDT hierarchy. It is also responsible for saving the forecasted data to the database at the most basic level within the FDT.

A forecast heuristic does not respond to the normalise command component itself but propagates the normalise command to the lower level components in the forecasting meta-framework. A forecast heuristic must provide rules for at least one forecast algorithm component (or child using class-based programming terminology) or another forecast heuristic component.

Figure 3A:
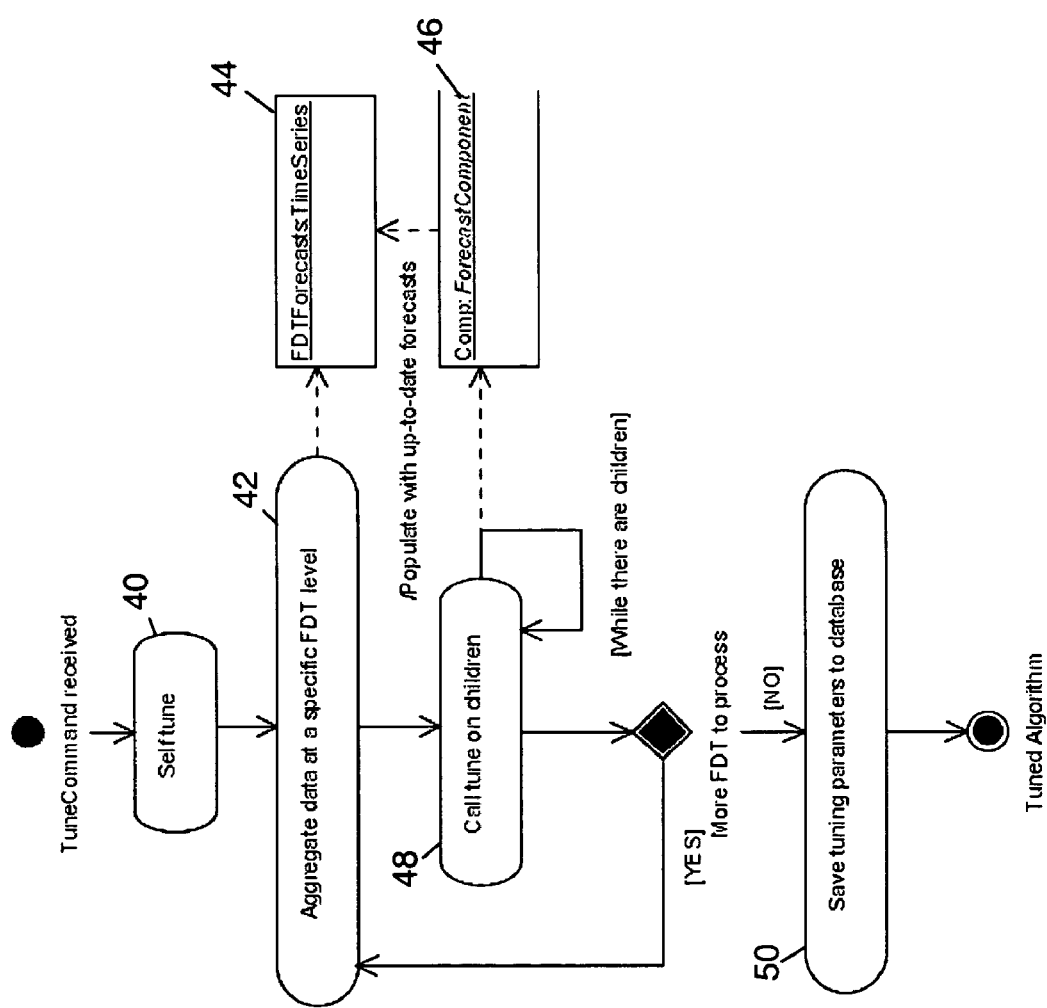
FIG. 3A shows steps performed in the tuning of a Forecast Heuristic according to an embodiment of the invention.

FIG. 3A shows schematically how a forecast heuristic component 16 as shown in FIG. 1A can be tuned according to an embodiment of the invention.

In FIG. 3A, a tune command received via interface 36 sown in FIG. 1B by the forecast engine initiates a self-tune component process 40 on the forecast algorithm. The next step in the main tuning process is to aggregate the time-series data stored at an appropriate level, for example a FDT can be used to aggregate the data (42).

The aggregated data is then provided as input to FDTForecasts: Timeseries data store 44. The Self-tune process 40 calls for a tune process to be performed on its children (step 48 in FIG. 3A), i.e., for each algorithmic component (core and non-core). The tune process iterates whilst there are still children (i.e., subprocesses present), each child (i.e., algorithm component) outputting the result of its respective tuning processes to the forecast component 46, which also generates data to be held in the FDT Forecasts: Timeseries data store 44.

Figure 3B:
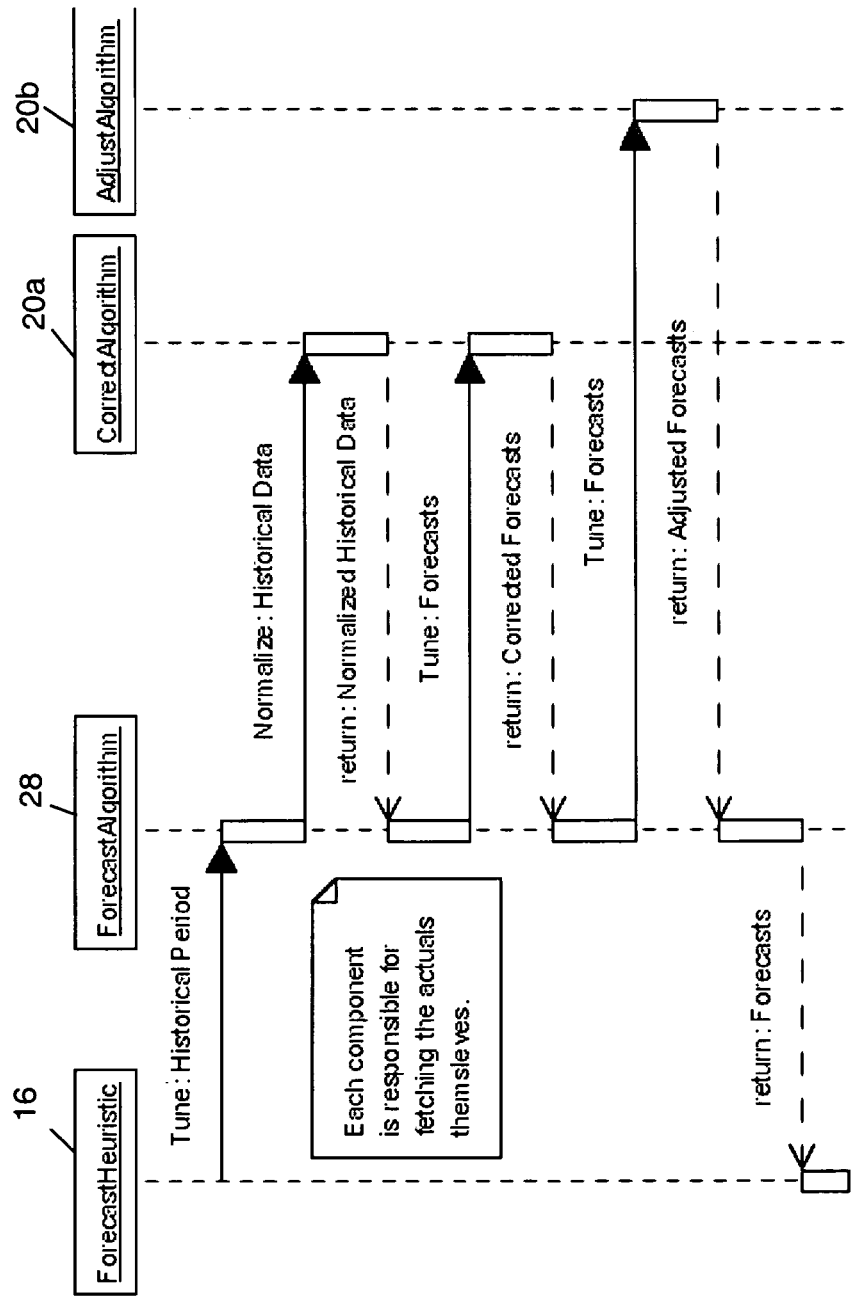
FIG. 3B shows a state diagram for the Tuning Sequence.

If no further FDT processes are required, the tuning parameters are saved to a suitable data store (step 50), and the forecast algorithm is now tuned, ready for the second pass of the data. FIG. 3B is a state diagram of the tune command process shown in FIG. 3A.

Figure 4A:
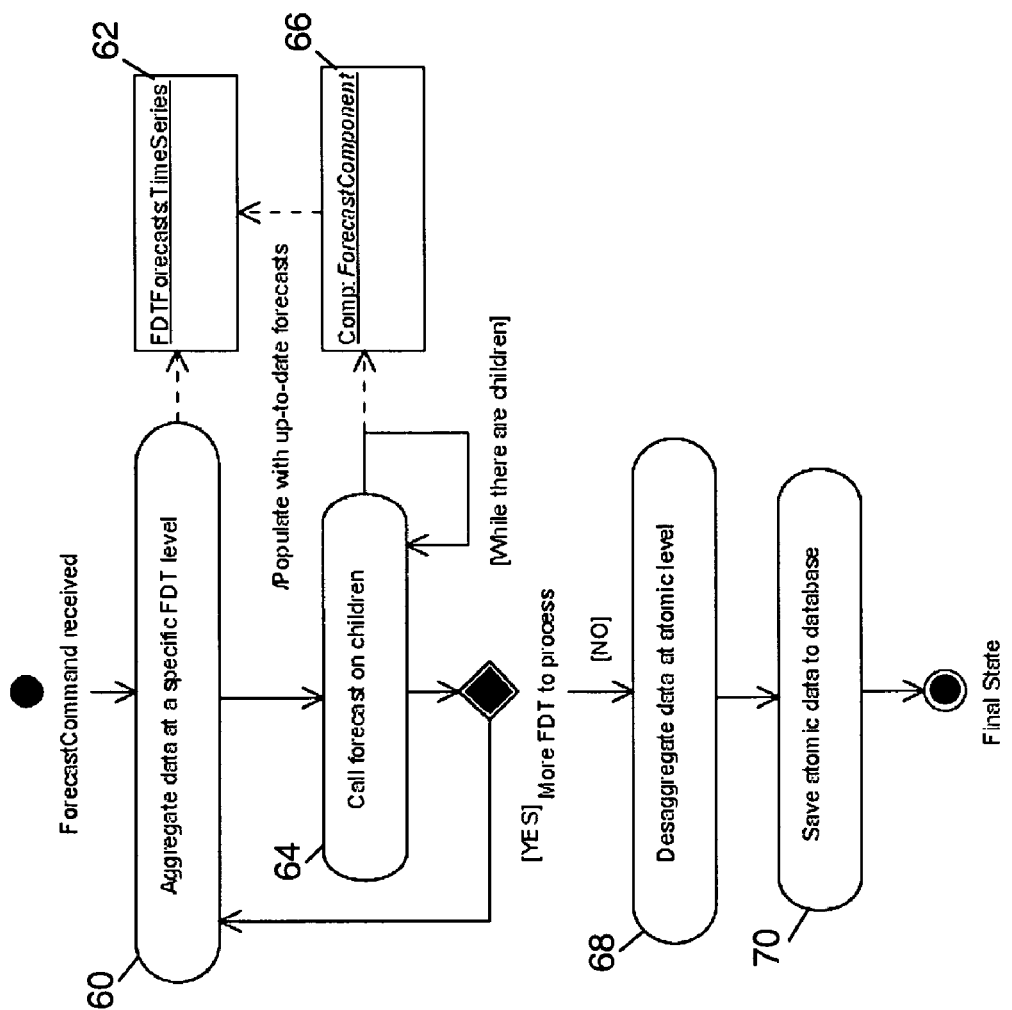
FIG. 4A shows steps performed in a forecast using a ForecastHeuristic according to another embodiment of the invention.
Figure 4B:
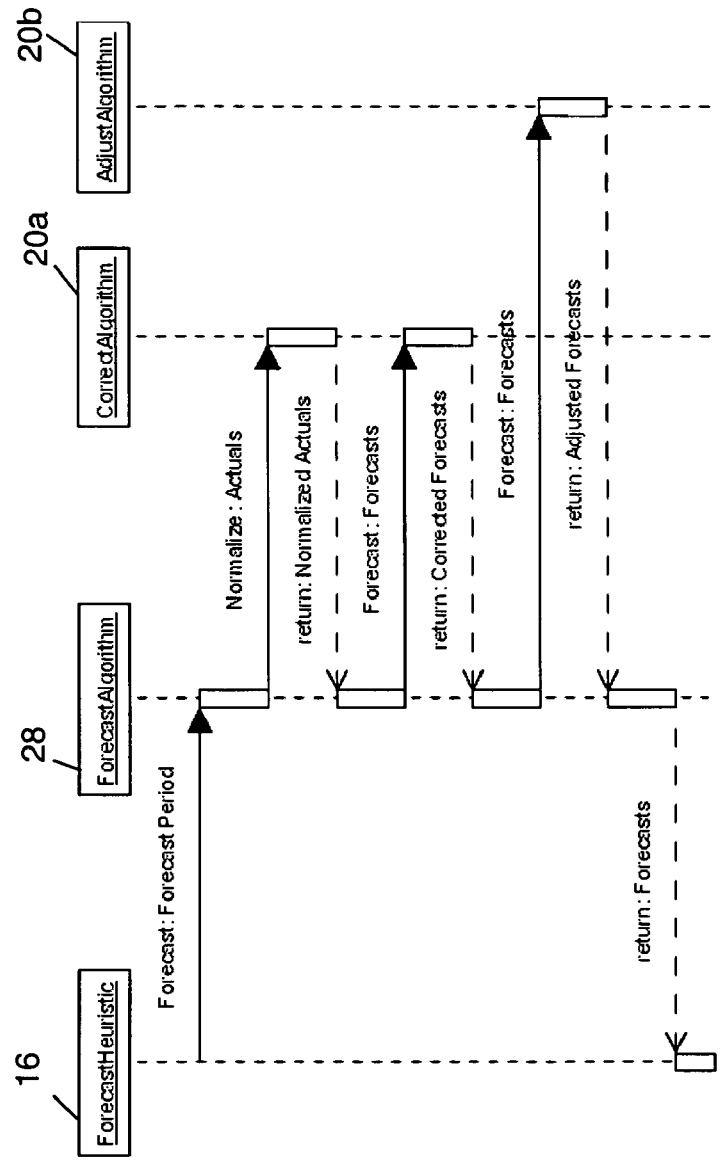
FIG. 4B shows a state diagram for the Forecasting Sequence.

FIG. 4A shows how the data is forecast using the ForecastHeuristic. In FIG. 4A, a forecast command 34 is received (for example via the user interface 30 shown in FIG. 1B, or by an internal process to the forecasting system). This then triggers the Forecasting Heuristic algorithm to be run using data aggregated in step 60 at the required FDT level and the ForecastHeuristic will provide output to the FDTforecasts: TimeSeries data store 62. Any child ForecastHeuristic processes are called 64, and their output is provided to Forecast component 66, which updates the forecast time-series data store 62. This is repeated for each FDT, until no more are required, in which case the Forecast Heuristic de-aggregates the data at the lowest level of the FDT tree (for example, referring now to FIG. 14, this is the data at the lowest level of the tree, i.e. the "atomic" level as indicated in FIG. 4A). FIG. 4B shows a state diagram for the forecast process shown in FIG. 4A.

In one embodiment of the invention, a forecast engine 28 comprises a "Bottom-Up" forecast heuristic component which provides logic to forecast and tune data. The "Bottom-Up" forecast heuristic component provides an implementation which operates on data provided at the lowest aggregation level, for example, un-aggregated data in the historical time-series data store. For example, if FDTs are used to aggregate data, data at the lowest level of aggregation, i.e., un-aggregated is referred to as data at the atomic level of an FDT hierarchy (see the lowest level of the tree schematic shown in FIG. 14 and described in more detail hereinbelow). The un-aggregated information can then be aggregated upward to obtain data at any level.

In another embodiment of the invention, a Split-Ratio implementation is provided by the forecast engine to forecast and tune data at a higher level of aggregation, for example, at a higher level n in the FDT hierarchy, and then split the data down to the un-aggregated, e.g. atomic level (level 0). The tuned atomic information can then be aggregated upward to obtain data at any level (for example, at a higher level of the tree shown schematically in FIG. 14).

Another embodiment of the invention provides a composite heuristic (also referred to as a "CompositeHeuristic") implementation. A composite heuristic comprises one or more forecast heuristic components. The composite heuristic forwards the commands it receives to one or more child forecast heuristic components, which enables different forecast heuristics to be combined together.

Figure 5:
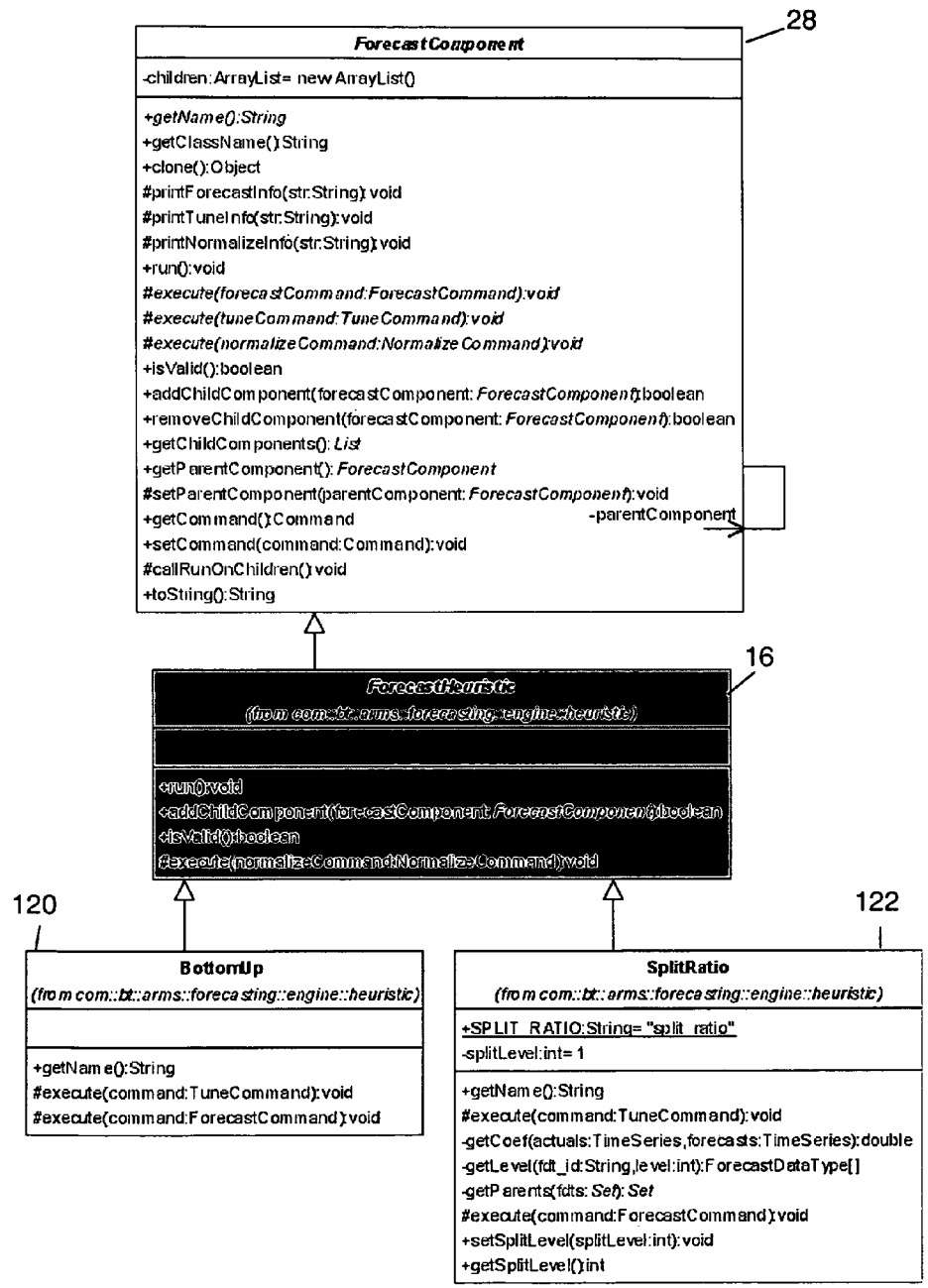
FIG. 5 shows an embodiment of a forecast heuristic component according to the invention.

FIG. 5 shows a composite heuristic which includes a "BottomUP" forecast heuristic. In FIG. 5 of the accompanying drawings in which forecast component 28 is associated with a hierarchy of forecast heuristic components 16, 120, 122. Here the main ForecastHeuristic component 16 comprises two child components, BottomUp component 120, and SplitRatio component 122.

The forecast algorithm component 28 constitutes the starting point in the creation of forecasted data. It is responsible for creating basic forecasts at any point on a given time series. It cannot leave one or more time periods without a value (complete forecasts). If necessary, the forecast algorithm 28 will ask its children (for example, any core forecast algorithm components and optional forecast algorithm components) to normalise the historical data the forecast algorithm 28 uses. This operation removes from the data any particular situation that could have impacted the normal behaviour of a time series, so that the forecast algorithm 28 operates on a smoother time series and so can generate better forecasts. Thus, a core forecast algorithm is always valid and can be run as a standalone component or associated with one or more child components, i.e., other forecast components. As any other forecast component, one instance of a forecast algorithm component cannot have more than one parent.

Figure 6:
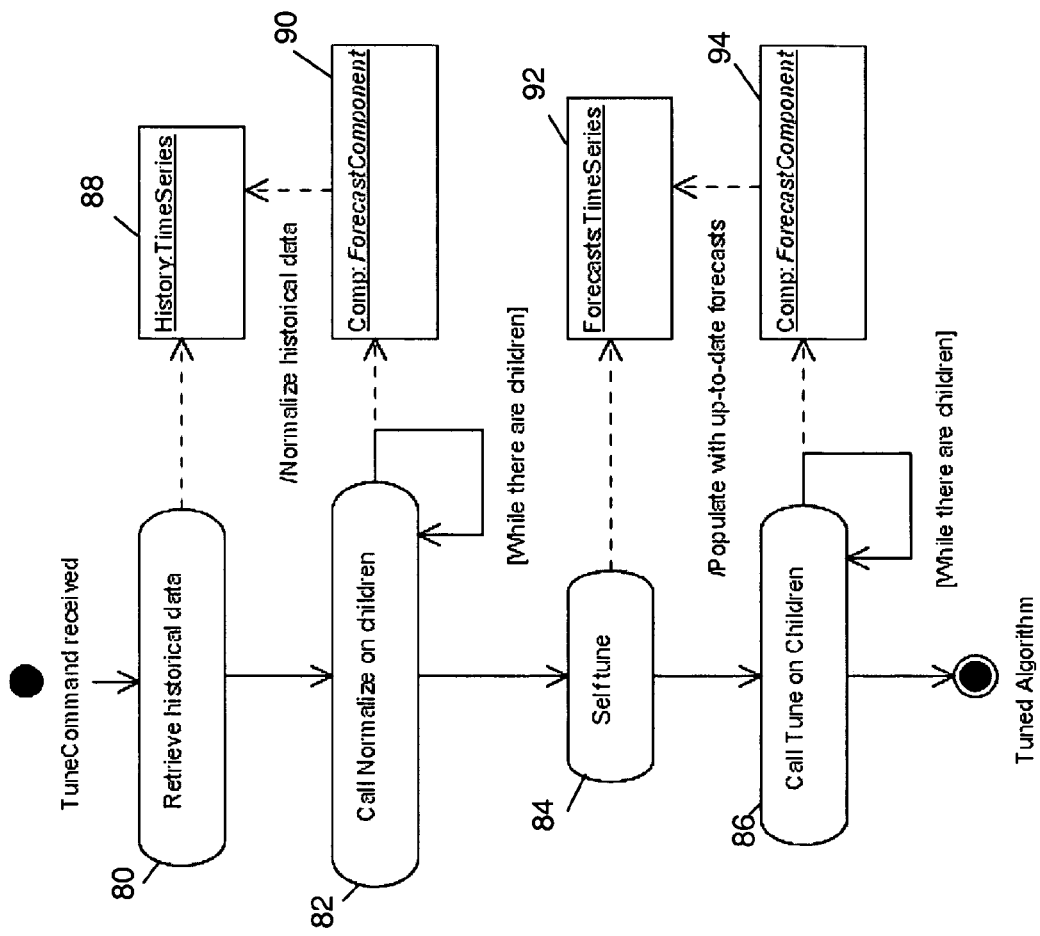
FIG. 6 shows the tuning of a ForecastAlgorithm according to an embodiment of the invention.

FIG. 6 shows an embodiment of a communication protocol for tuning a forecast algorithm component 28 according to the invention. In FIG. 6, a tune command is received by the forecast algorithm via a suitable interface. This triggers the forecast algorithm to retrieve historical data 80, which is output to a data store for the historical time-series data "History:TimeSeries" 88. If the forecast algorithm component has one (or more) child forecast algorithm components (i.e., one or more core or optional component algorithms) the forecast algorithm component will call the normalise command 82 for each child component in turn, which provides output in turn to the forecast component processing means "Comp: ForecastComponent" 90 which then provides normalised historical data to data store 88. After all children have been called to provide normalised historical data to the data store 88, the forecast algorithm performs a self-tune 84, which provides output to a data store, the Forecasts: Time Series data store 92, and also, if there are one (or more) child forecast algorithm components, the forecast algorithm calls tune on each child component in turn, so that their output can be provided to the forecast component processing means "Comp: ForecastComponent" 94 to update the data store 92. Those skilled in the art will appreciate that forecast component processing means 90, 94 may comprise the same processing means or distributed processing means, and that the processing means 90,94 may operate in parallel where appropriate.

Figure 7:
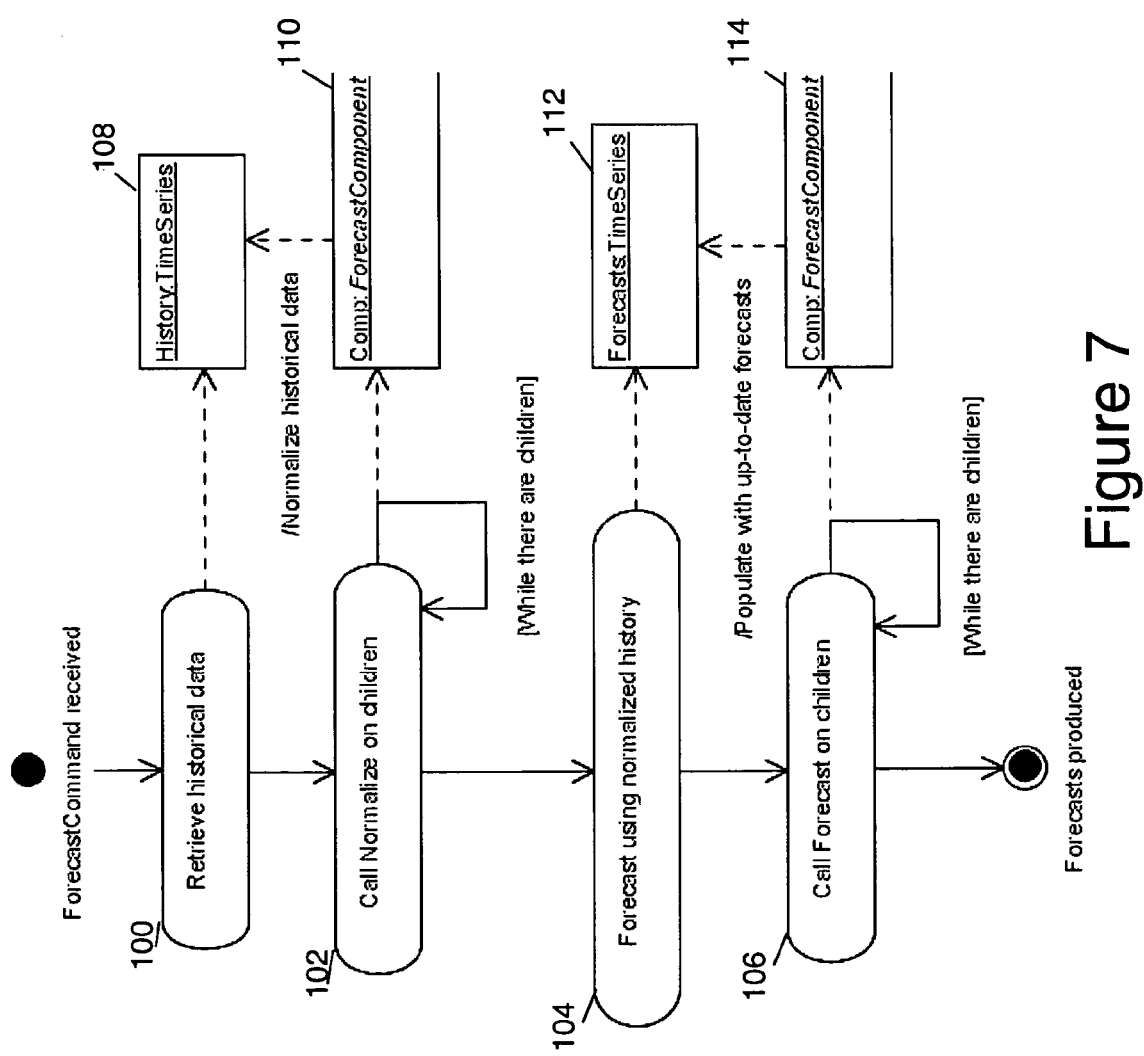
FIG. 7 shows forecasting through a ForecastAlgorithm according to an embodiment of the invention.

FIG. 7 shows steps in a communications protocol for forecasting using a forecast algorithm according to one embodiment of the invention. In FIG. 7, a forecast command is received by the forecast algorithm through an appropriate interface. This triggers the retrieval of historical data 100, which is then normalised and output by the forecast algorithm to a data store for the normalised time-series data, "HistoricalTimeSeries" data store 108. If one or more child forecast algorithm components exist, the normalise command is also called in turn for each child forecast algorithm component by the main forecast algorithm component, and the output from each child forecast algorithm component in turn is set to forecast component processing means 110, which outputs normalised data to data store 108. The normalised data is then used by the forecast algorithm to generate a forecast (104) using the normalised historical data in data store 108. The forecast data is stored in a forecast data store, "Forecast: TimeSeries" data store 112.

The main forecast algorithm component then calls each of its child forecast algorithm components 114, to update the data store 112. Finally, the collective result of the forecasting 104 using the main forecast algorithm (and the forecasting 106 using any child Forecast Algorithms) generates the required forecast on the normalised data (the historical time series data).

Figure 8:
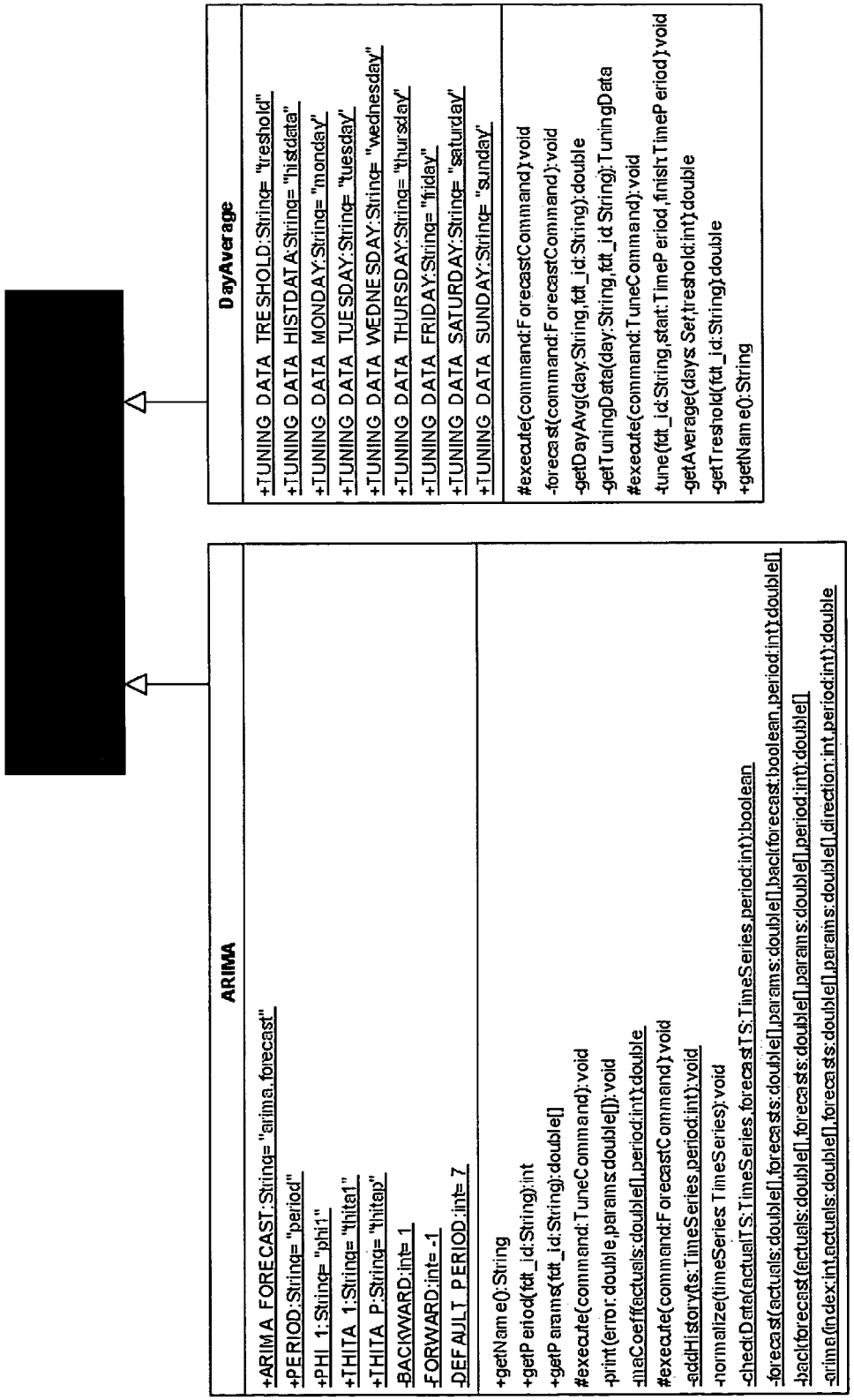
FIG. 8 shows a Forecast Algorithm according to an embodiment of the invention.

Exemplary implementations of the invention will now be described with reference to the accompanying drawings, in which FIG. 8 shows an implementation of a main forecast algorithm using ARIMA, which is well known to those of ordinary skill in the art. ARIMA (AutoRegressive Integrated Moving Average) uses lags and shifts in a time-series to discover patterns (e.g., moving averages and seasonal shifts) in order to predict the future. ARIMA is a method which determines how much of the past data should be used to predict a future observation (i.e., what number of weights should be used), and secondly the value of the weights to be applied to the data. In the embodiment shown in FIG. 8, the ARIMA forecast component is configured to work with a period parameter p which is by default 7. ARIMA is able to generate forecast provided that there is at least $2*(p+1)$ historical data. Another forecast algorithm shown in FIG. 8 is a "DayAverage" implementation of a forecast algorithm. The DayAverage forecast algorithm averages the historical data for every day (average for Mondays, Tuesdays . . . ) and then uses it to forecast. This algorithm only works if the time series is made of days.

The forecast algorithm components according to the invention are configured to be generic in the sense that they comprise a modular component. In this way, a forecast system development tool is provided which enable a user (e.g. a forecasts system designer) to simply select a the forecast algorithm component and associate with an appropriate forecast heuristic (for example, by dragging a visual representation of the forecast algorithm component to a designated portion of a graphical user interface for the forecast system development tool, whereby the component can be associated with the forecast heuristic). A user is free to select forecast algorithm components but the framework and/or heuristic for a particular forecast technique determines which components are optional or core (non-optional) processes for that particular forecasting technique.

An example of an optional generic component for the forecast algorithm is a "correct forecast algorithm" component which provides a correct algorithm to selectively corrects data in a historical time-series. In this way, a correct algorithm is a forecast algorithm capable of providing partial forecasts only, i.e., a correct algorithm does not have to give a value for all the data forming a time series, instead the algorithm generates a value to replace each item which requires the correction. An example of a correct algorithm is a forecast algorithm which provides forecasted data for bank holidays only without replacing the time-series data corresponding to other dates.

A correct algorithm provides a new value independently of the value it replaces in the time-series. In contrast, an adjust algorithm provided by an optional adjust forecast algorithm component must read the current value to be adjusted in the time-series, as the new value which will be provided by the adjust algorithm is dependent on the value it replaces in the time-series.

The correct algorithm component knows how to normalise a time series and removes certain items of data if these would adversely impact the forecast to be generated. For example, if in an embodiment of the invention, time-series data has particular the time periods which are "Unknown", then the adverse effect those periods could have on the forecasting algorithm are removed using a correct algorithm. Another way a correct algorithm is used in an embodiment of the invention is to remove the effect of a marketing campaign (which might increase sales, for instance). A correct algorithm is always valid and can be used as a standalone component (although only partial forecasts will be obtained using it). A correct forecast algorithm component uses the same communication protocol as a forecast algorithm component.

Figure 9:
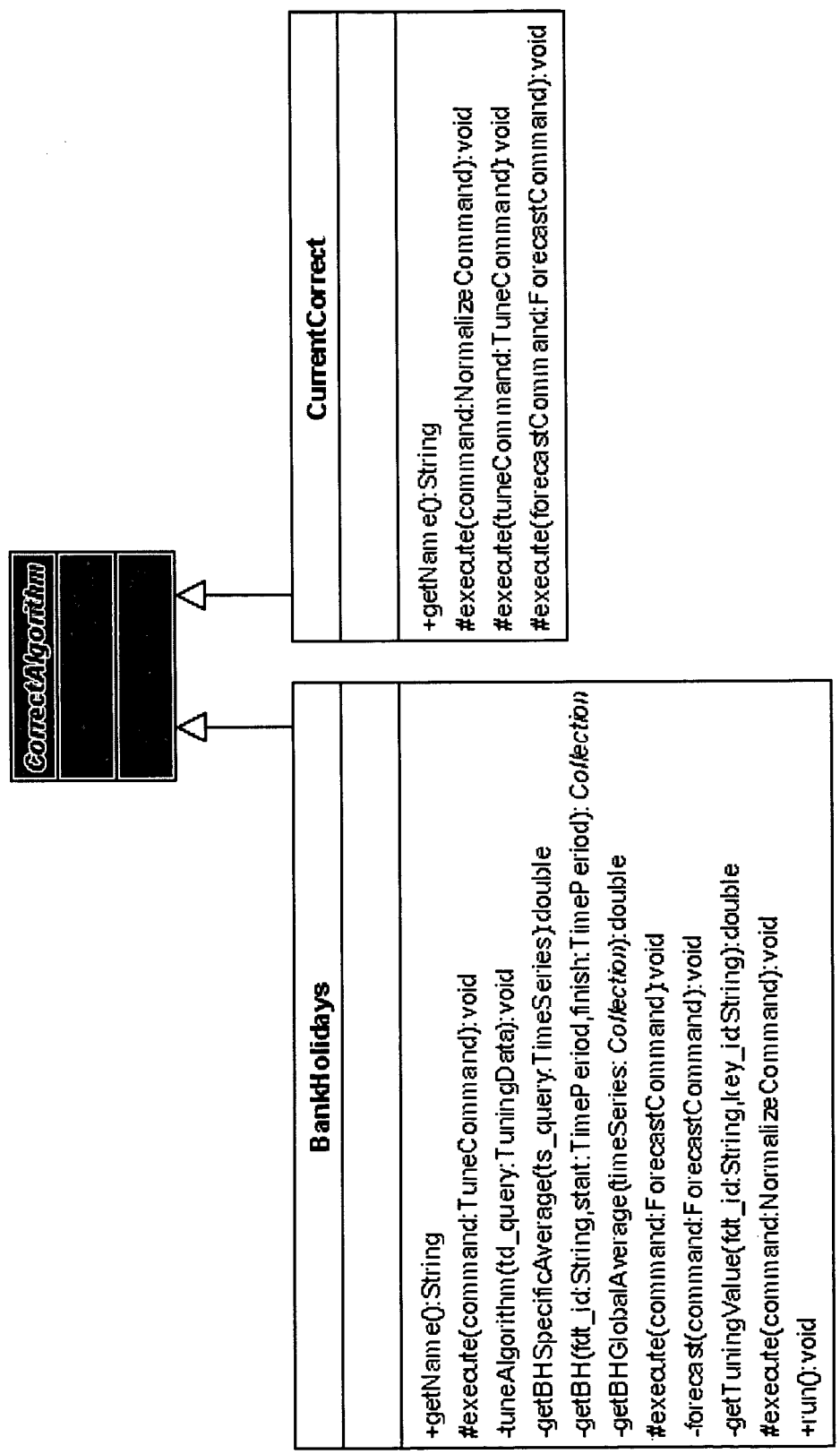
FIG. 9 shows a Correct Algorithm according to an embodiment of the invention.

FIG. 9 shows an embodiment of the invention in which a composite correct algorithm is provided comprising a BankHolidays correct algorithm and a CurrentCorrect algorithm. In FIG. 9, the BankHolidays correct algorithm provides a way to deal with bank holidays. By looking at past data it is able to give rough predictions of what happens on particular bank holidays, provided that enough data is available and that bank holidays have been referenced thoroughly. Its principal advantage is its capacity to smooth the actual data by removing bank holidays. This lead to a better performance of the forecasting algorithm it is associated with. The BankHolidays correct algorithm only works with time period of type "Day".

The CurrentCorrect algorithm embodiment of a correct algorithm shown in FIG. 9 removes from a time series the time period that contains the present time. For instance if the time period is of type "Day" then today will be removed. The CurrentCorrect algorithm doesn't forecast as such but is useful when normalising a time series since the current time period's data is incomplete.

Another embodiment of a correct algorithm comprises a MarketingCampaign correct algorithm which is arranged to trim the historical data after the marketing campaign is passed (normalisation) so that all the algorithms tune themselves on the new stable data. During the marketing campaign it will reduce the effect of the transition. The length of the trimming is determined through parameters.

Another embodiment of a correct algorithm comprises a user correct algorithm which allows the user to override values within the forecasted time series.

Another optional generic component in a forecasting engine according to the invention comprises an adjust forecast algorithm component which comprises an adjust algorithm ("AdjustAlgorithm") which receives forecast data as input and modifies the received forecast data to adjust for known influences such as the weather, marketing campaigns, etc, etc. An adjust algorithm tunes itself on the forecasted data that is passed to it in accordance with the forecast command protocol.

An adjust algorithm component has no sub-components (i.e., no children), and contributes adjustments to just one other forecast algorithm component (i.e., it must have only one parent algorithm).

Figure 10:
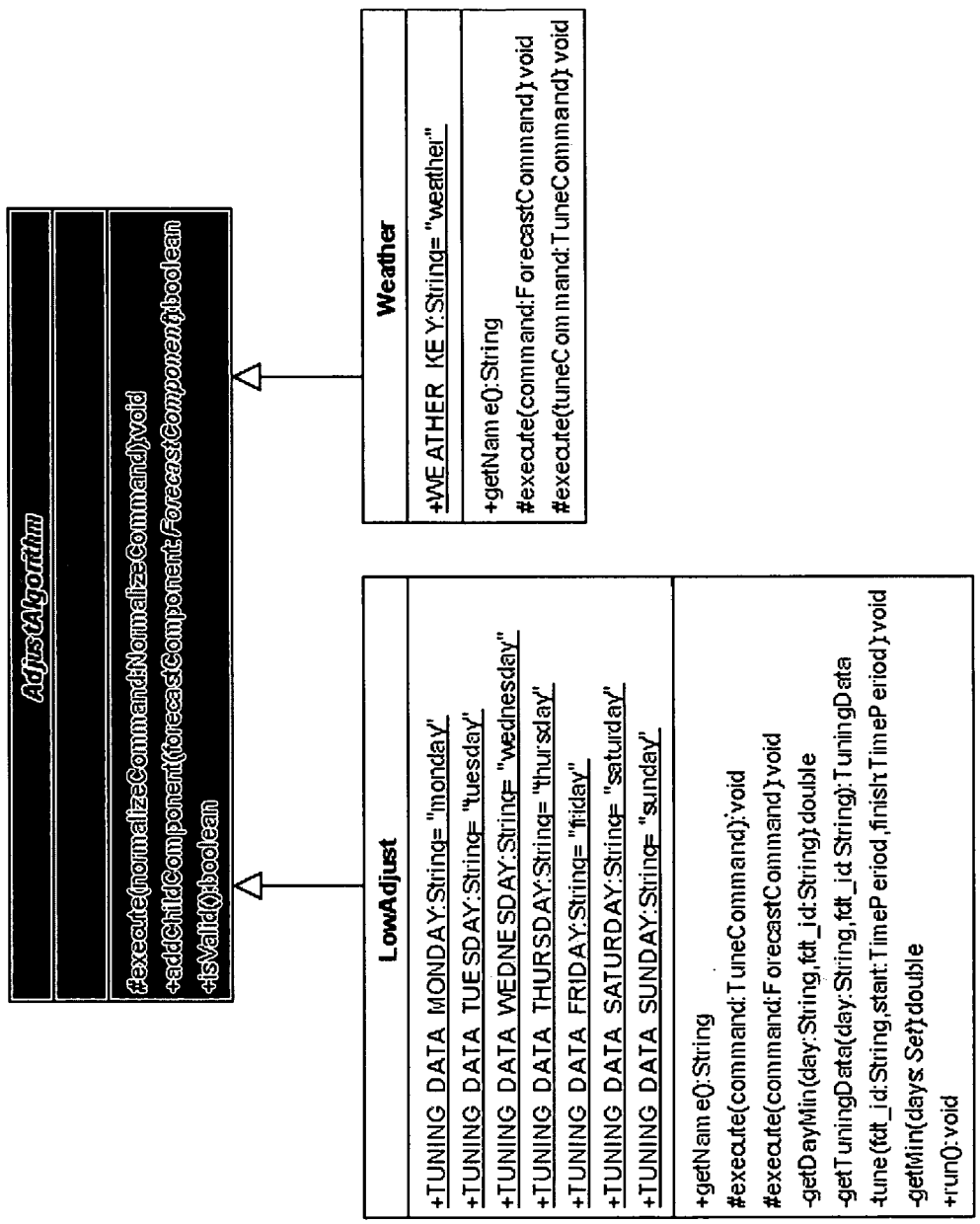
FIG. 10 shows an Adjust Algorithm according to an embodiment of the invention.

In FIG. 10, a composite adjust algorithm is shown comprising a LowAdjust Algorithm whose implementation only works with the "Day" time period (this can be extended to work with any other time period in alternative embodiments). The purpose of the LowAdjust algorithm is to identify minimal historical values and set them has a threshold for the minimal value in the forecasted. Also shown is a "Weather" adjust algorithm which identifies correlations between certain whether types and the error committed historically by the forecasts. The correlation coefficients found are then used to adjust on the forecasted data.

Another example of an adjust algorithm comprises a MarketingCampaign adjust algorithm which is arranged to trim the historical data after the marketing campaign is passed (normalisation) so that all the algorithms tune themselves on the new stable data. During the marketing campaign it will reduce the effect of the transition. The length of the trimming is determined through parameters provided by this algorithm.

The invention thus provides a development tool which enables forecasting systems to be constructed in a very simply manner using generic (core) components and optional components. Once a designer has constructed a forecasting system the forecast it generates can be tested and the accuracy of the forecast compared with forecasts generated by other forecasting systems constructed using the forecast development tool. In this way, the selection of the forecasting system most suited to the invention is greatly improved.

Figure 11:
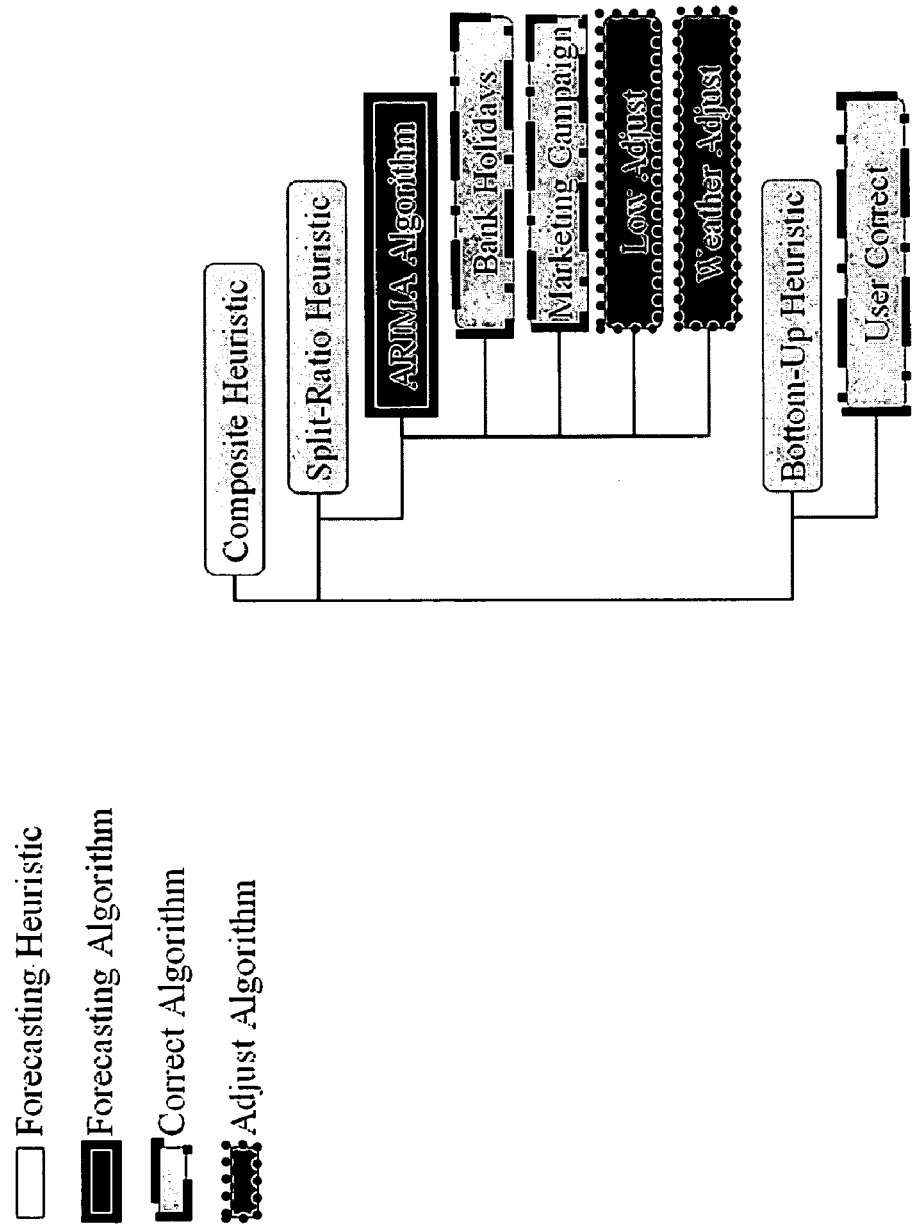
FIG. 11 shows an Engine Configuration according to an embodiment of the invention.

FIG. 11 shows an embodiment of a forecast system development tool according to the invention. In FIG. 11, a framework model is constructed by the forecast designer constructing a composite forecast heuristic comprising a split-ratio heuristic (which can comprise any appropriate split-ratio forecast heuristic known to those of ordinary skill in the art which can be adapted for use by the invention), and a Bottom-Up heuristic (which comprise a heuristic suitably arranged to operate on the least aggregated (atomic) level of time-series data).

The split-ratio forecast heuristic component comprises logic for associating the core (non-optional) forecast algorithm (the ARIMA forecast algorithm) with a number of optional forecast algorithm components. In FIG. 11, two optional correct forecast algorithm components (Bank Holidays and Marketing Campaign) and two optional adjust forecast algorithm components (Low Adjust and Weather Adjust) are shown. The Bottom-Up heuristic component provides logic which enables the optional correct forecast component User Correct to operate on the time-series data for which a forecasts is to be generated.

The order in which forecast components are added to a forecast framework can affect the overall forecast generated as a forecast component may use the time-series data provide by a forecast component which is executed before it. This is particularly important where a forecast component operates to remove/add data from/to a time-series. For example, if a user were to position the Weather Adjust component before the Bank Holidays component, then the Weather Adjust component would work on data containing the Bank Holidays artefacts (which might be a desired effect or not).

The construction of a forecast engine by associating different forecast algorithms requires the different forecasting techniques to be capable of co-existing within a common framework so that when required to do so, they are capable of collaborating together. Each algorithmic component must take into consideration its position within the execution of the global forecasting strategy in order to tune and forecast properly. Failure to do so results in a decrease of the quality of the forecasts.

Figure 12:
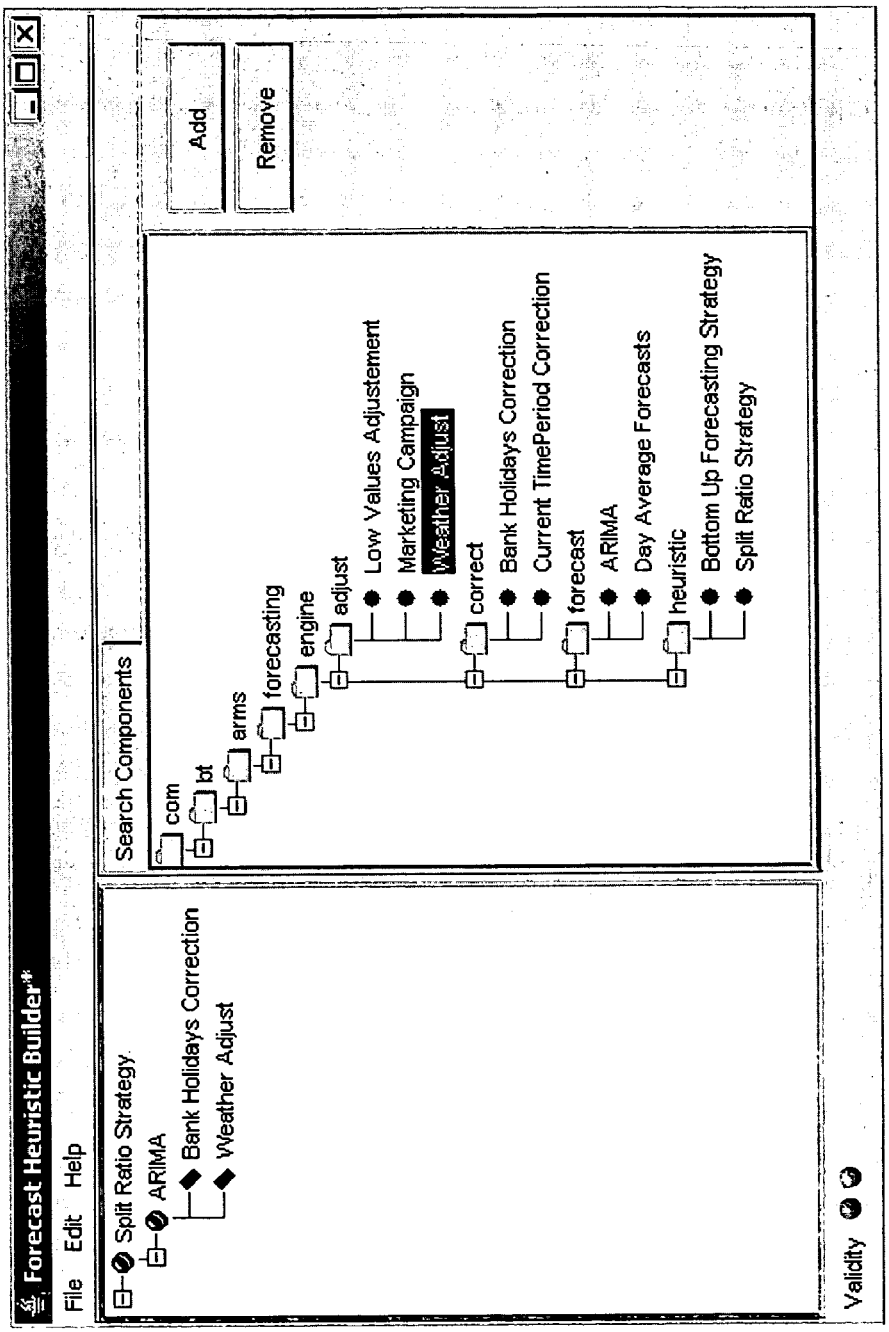
FIG. 12 shows a screen display of forecast heuristic builder according to an embodiment of the invention.

FIG. 12 shows how in one embodiment of a user interface of a forecast system development tool for generating a forecast according to the invention. The user interface may be implemented as an application driven graphical user interface or as a web-portal for example, depending on what technology supports the forecast system development tool application. In FIG. 12, a computer or other appropriate device is arranged to support a forecasting system development tool application which in operation displays a screen enabling the user to select optional and/or core forecast algorithm components and/or heuristic components to construct a forecasting engine. In FIG. 12, a windows-type graphical user interface is shown comprising a visual forecast heuristic builder user interface window for developing a forecasting heuristic framework.

A graphical user interface for developing a forecast system according to the invention comprises an active framework construction portion and a forecast algorithm component selection portion. A forecast algorithm component is selected by the user from a range of components shown in the forecast algorithm component selection portion. A forecast algorithm component is associated by the user with the forecast heuristic framework by the user either dragging a representation of the component (e.g. an icon) over to the framework or cut and pasting a representation or in any other suitable way known to those skilled in the art.

In FIG. 12, the windows screen has been split into the active framework construction portion on the left-hand side and a right-hand component selection portion. The left-half of the screen shows the a split-ratio strategy has been selected for use with an ARIMA Forecasting Algorithm and a BankHolidays CorrectAlgorithm and a WeatherAdjustAlgorithm. The right-hand side shows in an appropriate hierarchical structure, the optional components the user can select from to include in the forecast engine they are constructing.

The forecast design tool enables the task of designing customised forecast engines to be considerably de-skilled as a user need not be aware of the validity of the components they are selecting for a particular forecast strategy (or heuristic). The forecast design tool automatically checks the validity of a particular forecasting strategy (i.e., heuristic) using rules directly implemented within the different components.

The forecast design tool thus enables a user to build a forecast algorithm by simply dragging a component from the library on the right hand side of the screen into the tree on the left hand side. Once the different modular forecast components are assembled together, and under the condition that their association is valid, the resulting forecast heuristic is saved in an appropriate format, for example, XML format.

Figure 13:
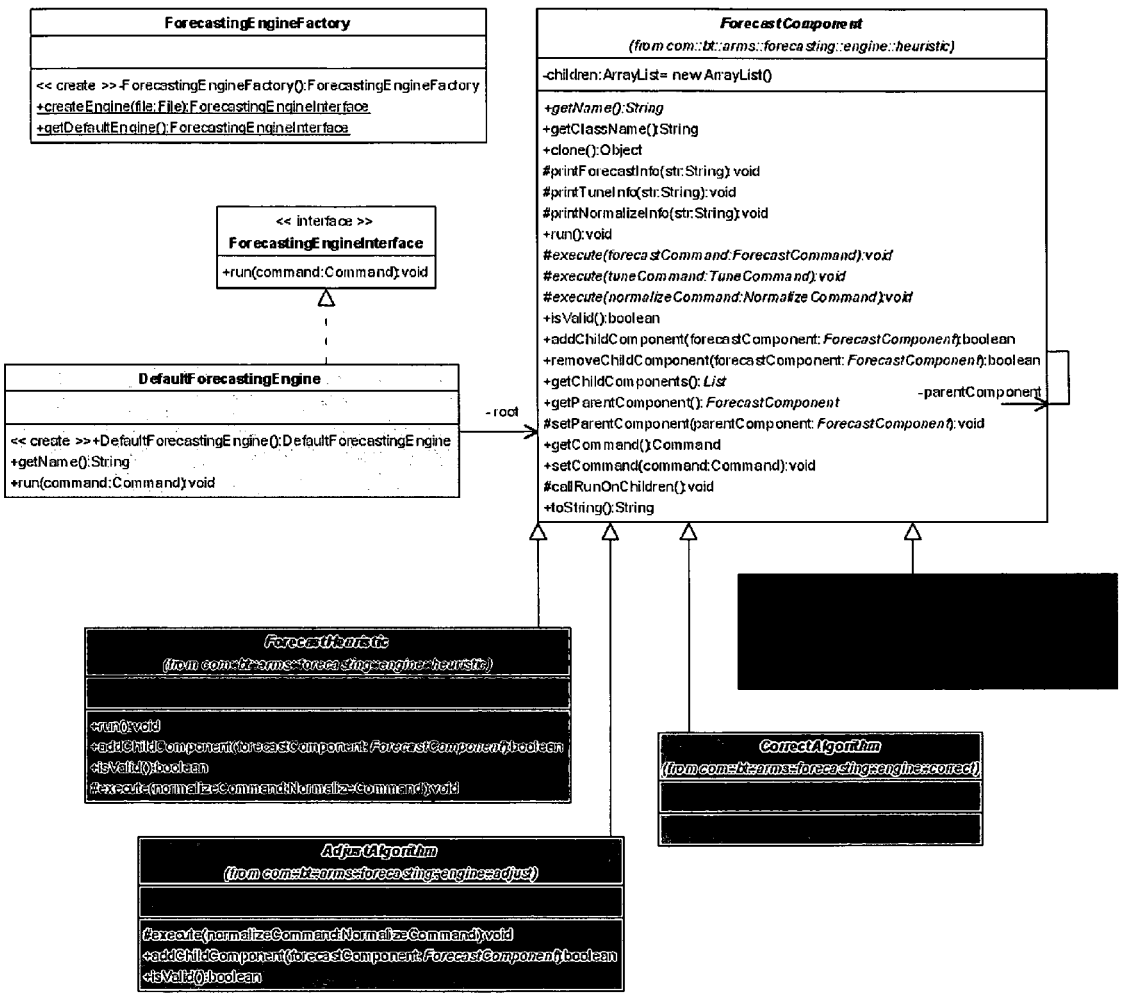
FIG. 13 shows a ForecastHeuristic factory class Diagram according to an embodiment of the invention.

The forecast system development application converts the stored XML formatted heuristic into appropriate code prior to use by the forecast algorithm using an engine factory. FIG. 13 shows a class diagram of the embodiment of a forecast algorithm component constructed in FIG. 12, showing the LowAdjust and Weather Adjust Algorithm components inter alia.

Figure 14:
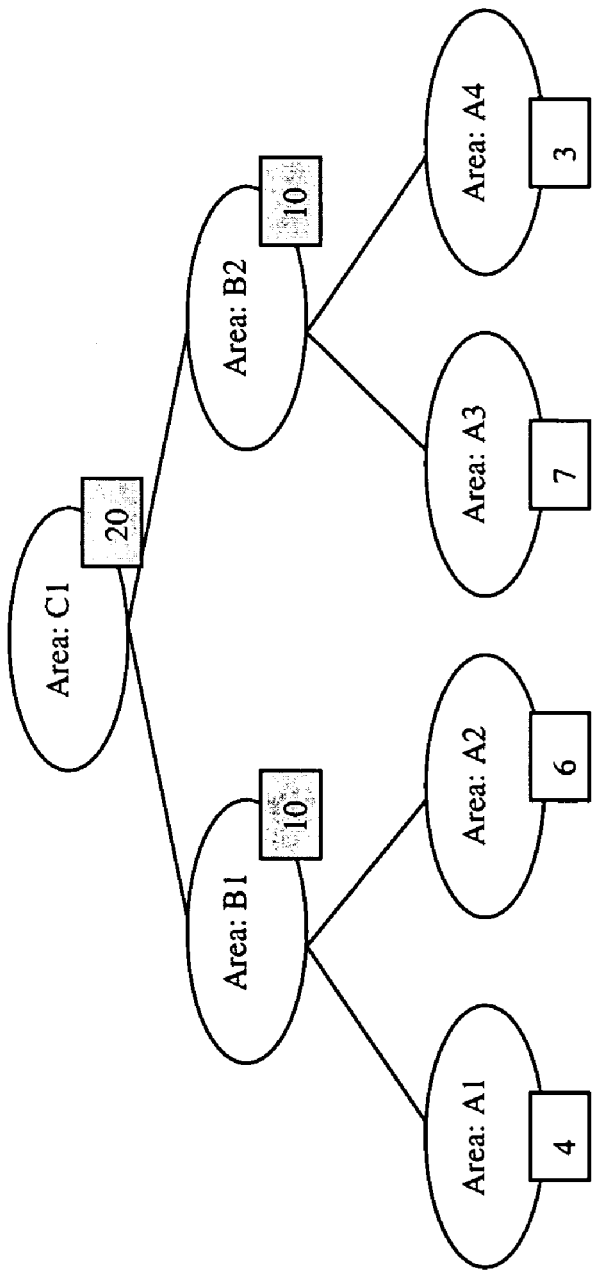
FIG. 14 shows a system of hierarchically parameterised time-series data for which forecasting is performed in one embodiment of the invention.

Further embodiments of the invention will now be described with reference to FIGS. 14 to 17J of the accompanying drawing to demonstrate how the heuristic forecast component provides logic to enable different time series to be associated with different parameters. FIG. 14 shows schematically a leaf (or nodal) hierarchy of parameters in a time-series, here for example, areas, in which each area is associated with a specific number of historical volumes. The leaf areas in the hierarchy are based on the recordings of the historical volumes (displayed in the box next to each area), while the top areas estimate the volumes through aggregation from the areas below (displayed in shaded boxes). A variety of forecasts can be generated for each of the areas shown using the invention, for example, a forecast for area C1 can be generated by forecasting on the historical values at the C1 level. Alternatively, it is possible to forecast on the historical values of each leaf area (A1, A2, A3 & A4), then to aggregate all the forecasted volumes upwards. In another embodiment of the invention, the historical volumes are first aggregated from the leaf levels to the middle level (B1 & B2). A forecast is then generated on the middle level, before aggregating the actual forecast data upwards.

Those skilled in the art will be aware that many other possibilities exist and that the level of forecast differentiation which the development tool provides for a forecast system enables the generation of a forecast on a specific level which may be more accurate and stable than that generated by the same forecasting system for other area levels. One embodiment of the invention also enables a forecast system to be developed which is generic enough in order to cope with both different forecast algorithms and also forecast algorithms having different parameters by providing a generic heuristic forecast component comprising logic (i.e., instructions or a rule set) to implement a user selected forecasting strategy for a particular time-series. For example, in conjunction with a forecast data type (FDT) such as is described in the inventors co-pending GB patent application GB-A-0502494 which enables the complexity of different parameters to be encapsulated. Once the heuristic forecast algorithm has been specified, the operation of the remaining forecast components can be the same.

Figures 15A, 15B:
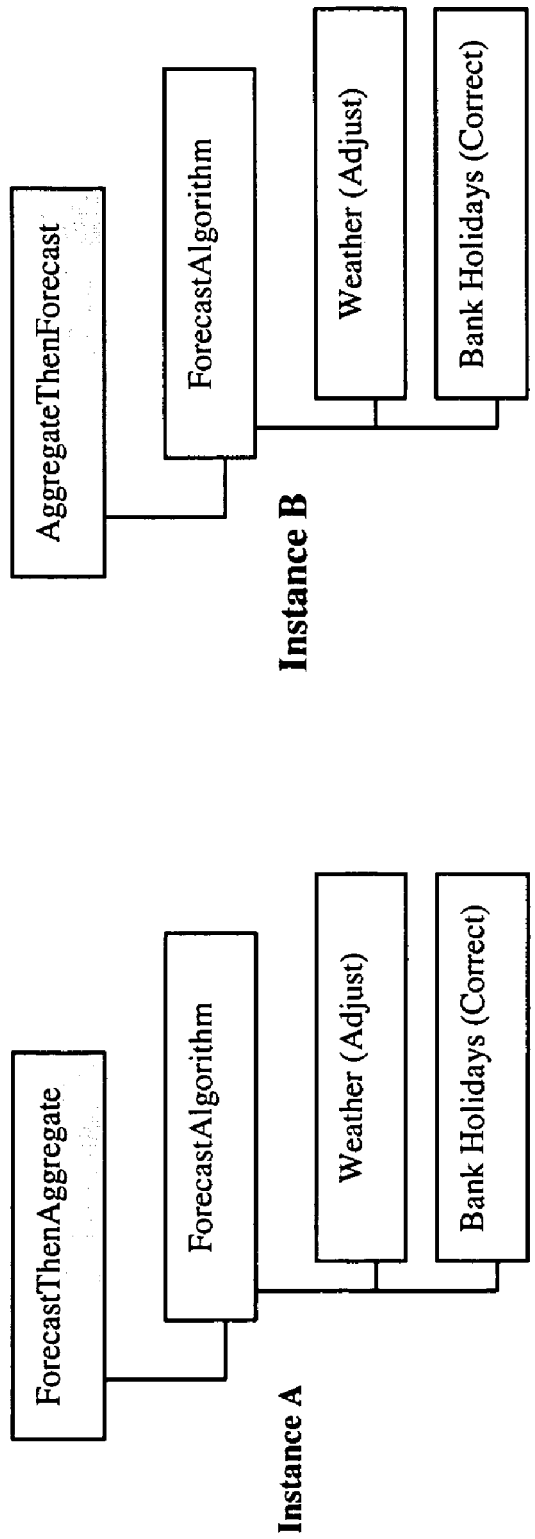
FIGS. 15A and B shows embodiments of a forecasting process according to the invention.

The operation of the forecasting framework associated with a forecasting heuristic will now be described with reference to FIGS. 15A and 15B of the accompanying drawings which show two embodiments of a Forecasting Meta Framework (FMF). FIGS. 15A and 15B demonstrate the different ways the two different heuristic forecast components influence the operation of the FMF. FIG. 15A shows a heuristic forecast component which generates a forecast which is then aggregated to a particular level in the hierarchy of parameters comprising the time-series, and FIG. 15B shows a heuristic forecast component in which time-series data first aggregated and a forecast is generated based on the aggregated values of the parameters froming the time-series. Both the first and second instance of the forecast heuristic shown in FIGS. 15A and 15B comprise a core forecast algorithm together with two optional forecast algorithm components, an adjust algorithm (Weather(Adjust)) and a correct algorithm (Bank Holidays (Correct)).

In FIGS. 16A to 16J, steps in the execution of the forecast engine commands are shown schematically for the FMF shown in FIG. 15A, whereas in FIGS. 17A to 17J, steps in the execution of the forecasting engine for FMF shown in FIG. 15A.

Figure 16A:
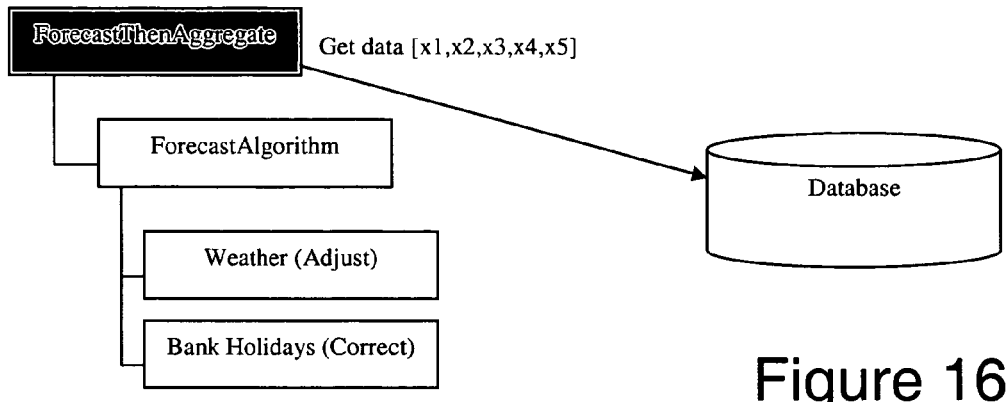
FIGS. 16A to J show a run tune process on the embodiment of the invention shown in FIG. 15A.

In the forecast meta framework which supports a forecasting heuristic which generates a forecast first, and then aggregates the data output, the tune command comprises:

FIG. 16A: a call tune on heuristic step, in which the forecast heuristic algorithm reads all the required data from the database. Then it forms the specific time series data set that the rest of the framework will work with to generate a forecast. In the case of Instance A, the time series will be volumes of all leaf areas.

Figure 16B:
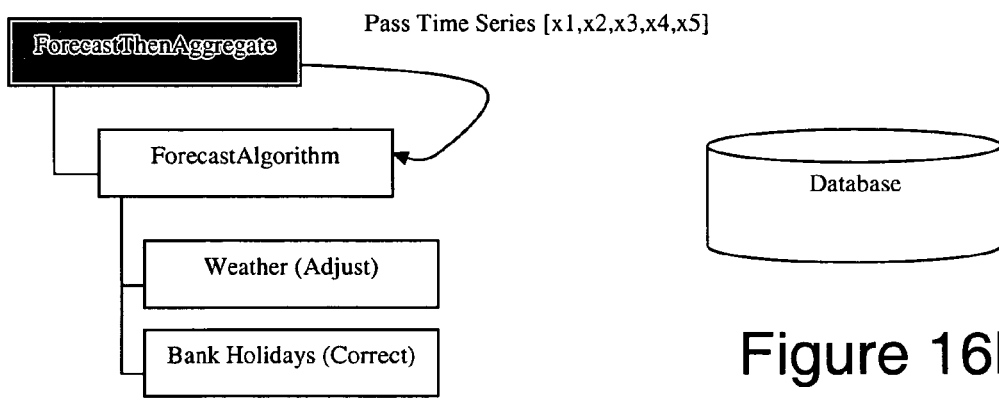

FIG. 16B: the forecast heuristic algorithm calls the tuning action (i.e., invokes a tuning command component) to tune a child (forecast component) step, in which the forecast heuristic passes the time series of each leaf area to the forecast algorithm. This step is executed iteratively for each leaf area.

Figure 16C:
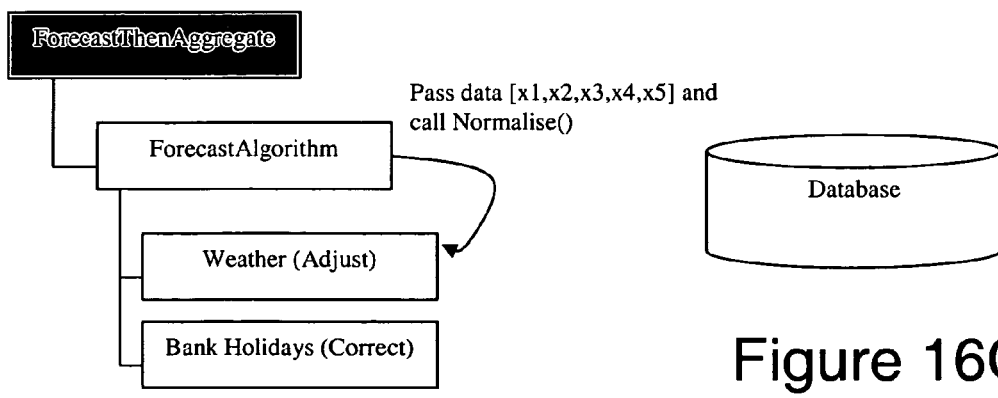

FIG. 16C: the forecast algorithm component calls Normalize (i.e., invokes a normalise command component) on the adjust algorithmic component, to which the forecast component passes the time series to the adjust algorithmic component. Optionally, if required, the Normalise command component is also invoked for any optional forecast algorithm components.

Figure 16D:
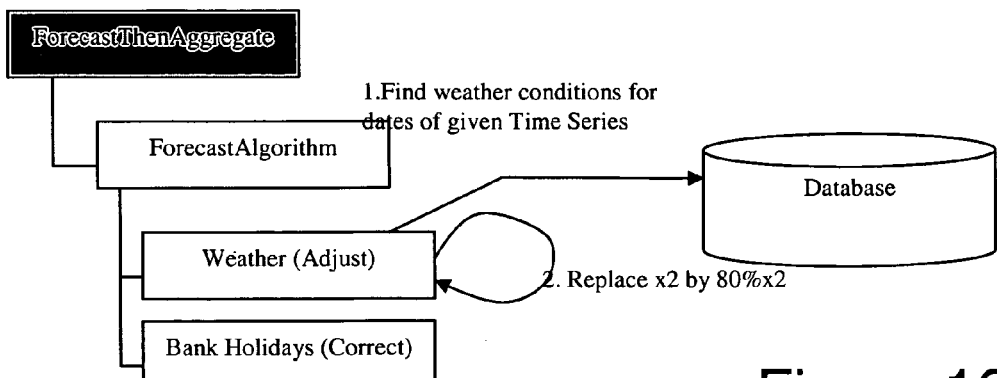

FIG. 16D: Weather adjusts Time Series steps. In this step, an optional weather adjust forecast algorithm component, performs a number of steps: firstly, to read a weather adjust time series data store, and secondly, if a particular parameter is present in the weather adjust time-series data store, to adjust the historical data accordingly. For example, if on the date of the second value of the passed weather adjusted time series, there was heavy snow, and the snow is usually responsible for a 20% increase on the main historical data, then the weather adjust may adjust the historical data "x2" to "80% x2" (which will remove the effect of the weather being snowy).

Figure 16E:
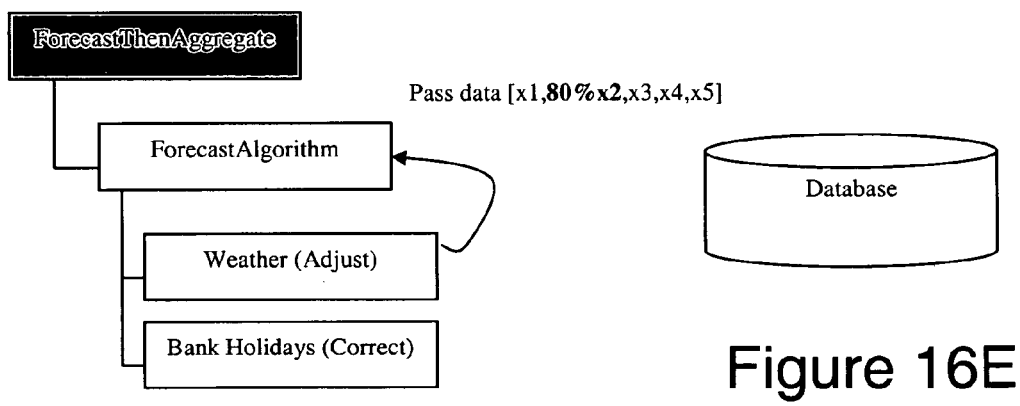

FIG. 16E: The weather adjust forecast algorithm component returns the adjusted data to the main (core) forecast component, which returns the modified time series.

Figure 16F:
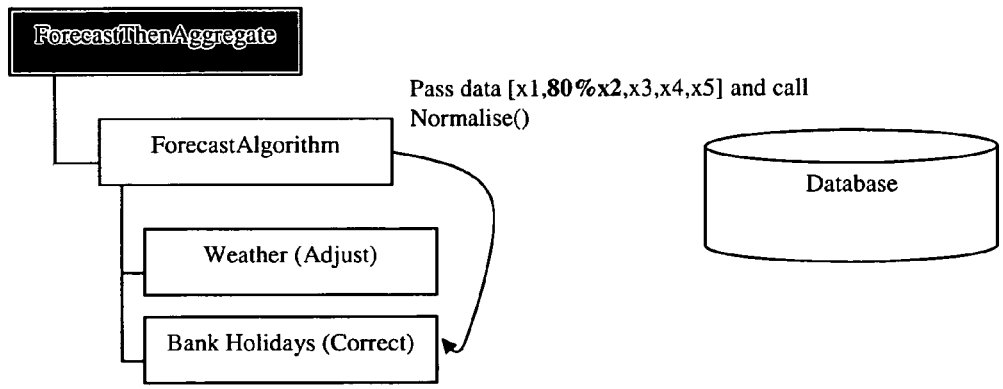

FIG. 16F: The core forecast algorithm component passes data (the time series returned by the weather adjust forecast algorithm) to the correct forecast algorithm and invokes the normalise command component on the correct forecast algorithm component (Bank Holidays).

Figure 16G:
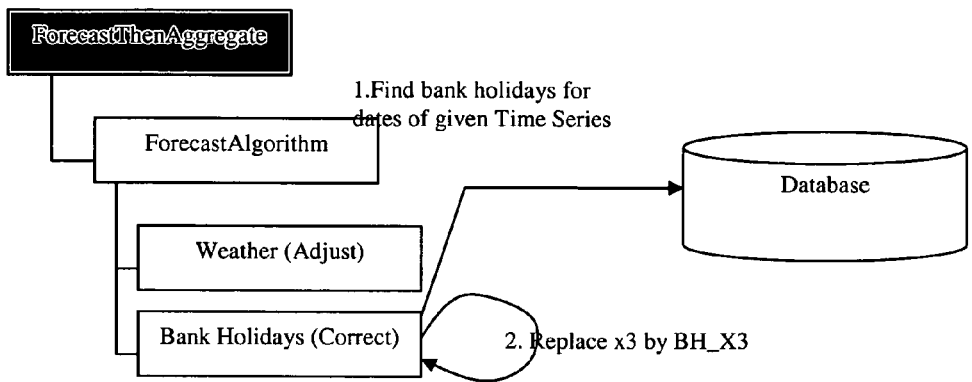

FIG. 16G: The correct forecast algoritihm component "Bank Holidays" corrects the time series, by performing a number of steps. Firstly, the correct forecast algorithm component reads the Bank Holidays time-series database. If any entries indicate that a correction to the historic time-series data passed to the core forecasting alogirthm, for example if the Bank Holidays adjust algorithm finds that on the date of the third value of the passed time-series, it was a bank holiday, then BankHolidays adjust algorithm will replace the existing value of the time-series with a value determined by the particular implementation of the BankHolidays adjust algorithm component. In this example, the BankHolidays adjust algorithm adjusts x3 to remove the bank holiday effect: BH_X3 (to take bank holiday effect out).

Figure 16H:
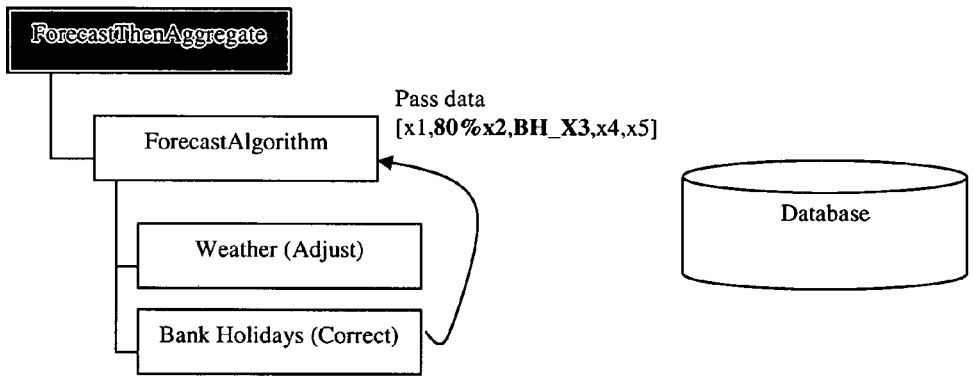
Figure 16I:
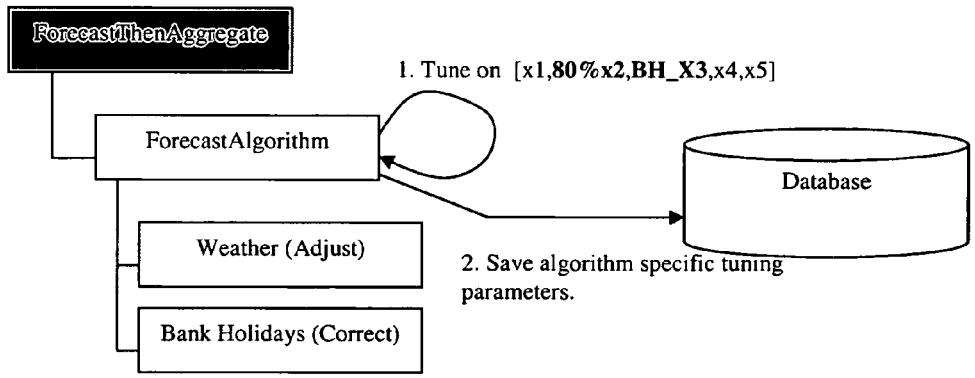

FIG. 16H: The bank holidays adjust algorithm returns the corrected data to forecast component, and returns the modified time series FIG. 16I: Forecast Algorithm tunes itself with the returned data. The operation of tuning is specific to the algorithm at hand. The results are stored on the database. This database interaction is independent of the original time series passed by the forecast heuristic which are not modified.

Figure 16J:
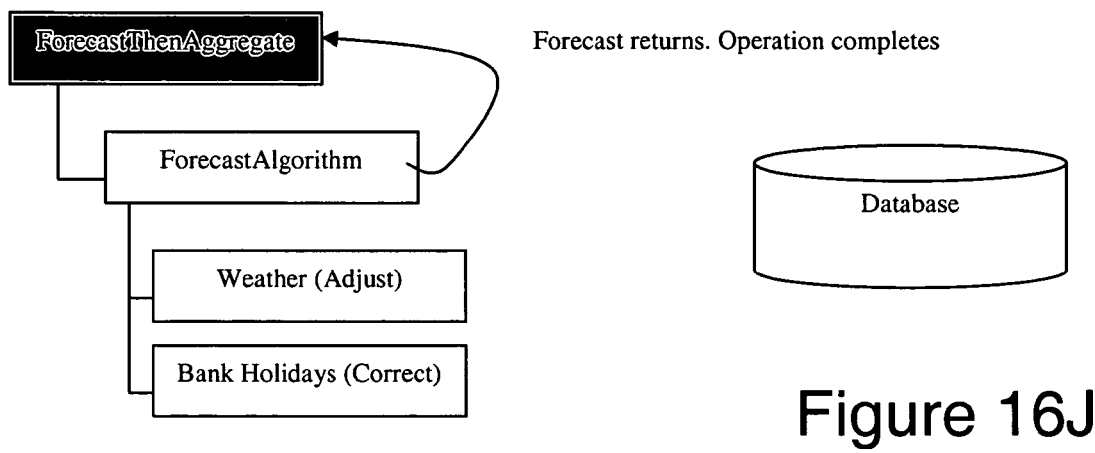

FIG. 16J: The heuristic forecasting operation completes. The heuristic forecast algorithm takes no additional action and does not store anything in the time-series database as the original historical volumes [x1,x2,x3,x4,x5] remain unmodified.

The embodiment of the FMF shown in FIG. 15A performs these steps one at a time for all leaf areas shown in FIG. 14.

Considering now the FMF shown in FIG. 15B, the tune command run on Instance B results in the same operation except that whereas the data to be read from the database is the same as shown in FIG. 16A, the time series passed to the child forecast heuristic component is different as the values would correspond to the aggregated volumes at the top area level (C1 in FIG. 14). In addition, the tune command is executed once only, as only one area (the top one—C1 in FIG. 14) and not all the leaf nodes. Although the forecast heuristic is now modified, all other components can remain the same.

FIGS. 17A to 17J show steps in the run forecast process when called for the FMF shown in FIG. 15A.

Figure 17A:
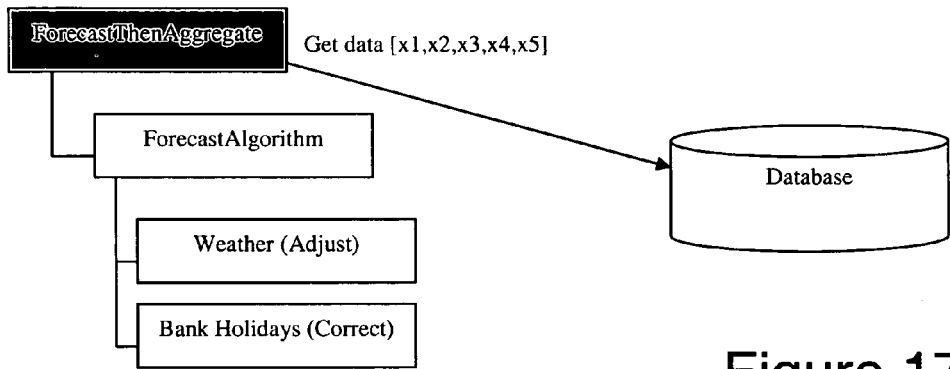
FIGS. 17A to J show the run forecast process on the embodiment shown in FIG. 15A.

FIG. 17A: The framework invokes the forecast command for the heuristic (which the user has selected—a "call forecast on heuristic" step). The heuristic forecast program component reads all the required data from the database and forms a specific time series for the rest of the framework will work with. In the case of Instance A, the time series will be volumes of all leaf areas. The next steps are identical up to the point of FIG. 16H, and the process resumes from step shown in FIG. 17B (replacing the steps shown in FIG. 16I of the tuning embodiment of the invention described herein above).

Figure 17B:
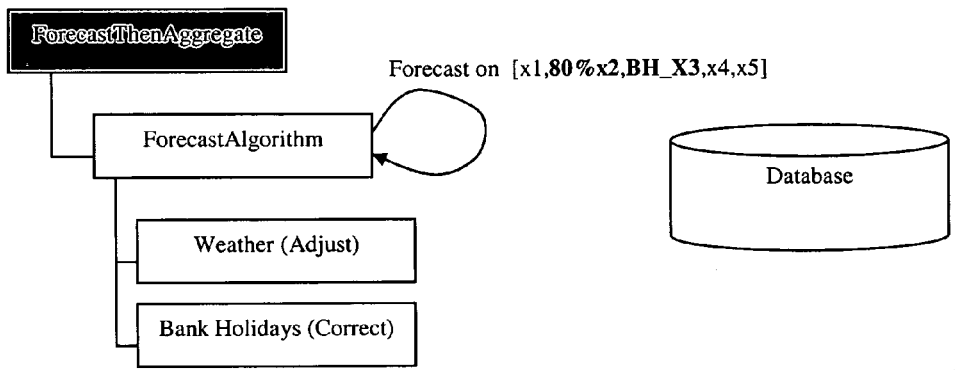

FIG. 17B: The core forecast algorithm forecasts using the date returned from the previous step. The operation of forecasting is specific to the algorithm at hand and the results are not stored in the time-series database.

Figure 17C:
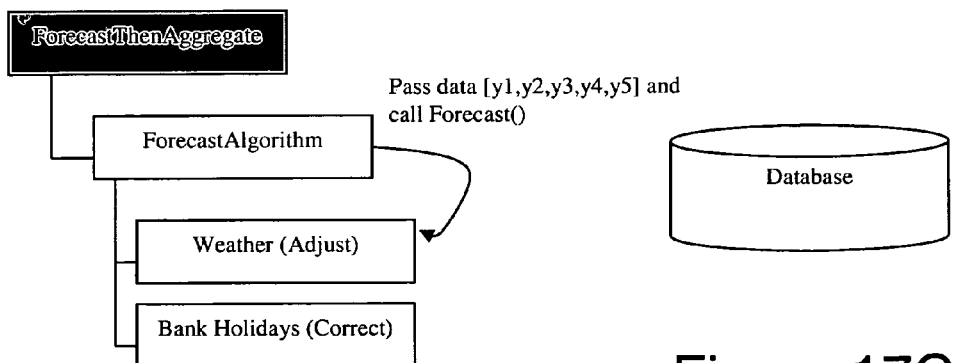

FIG. 17C: The core forecast component calls Forecast on the Adjust child (i.e., invokes the forecast command component on the optional "Weather" adjust forecasting algorithm component). The forecast component passes the forecast time series results to the and calls the forecast function on the children.

Figure 17D:
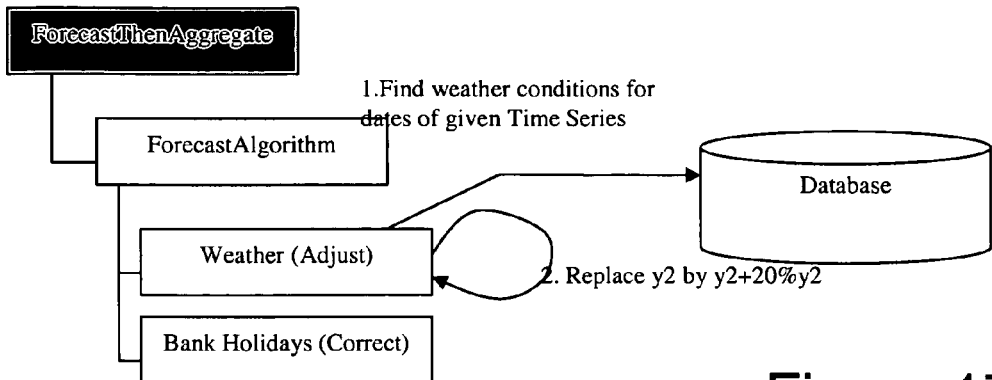

FIG. 17D: The Weather adjust forecast component adjusts the forecast time series results from the previous step. The weather adjust forecast component does this by performing a number of steps: firstly, the weather adjust forecast algorithm component reads its associated data store. If the weather adjust forecast algorithm component then finds that one or more of the time-series datum received requires adjustment on particular dates, then it adjusts each time-series datum accordingly. For example, if on the date of the second value of the forecasted time series, heavy snow is expected and snow is usually responsible for a 20% increase of volumes, then the weather adjust algorithm adjusts y2 by a y2+20% y2 (to give the predicted snow effect).

Figure 17E:
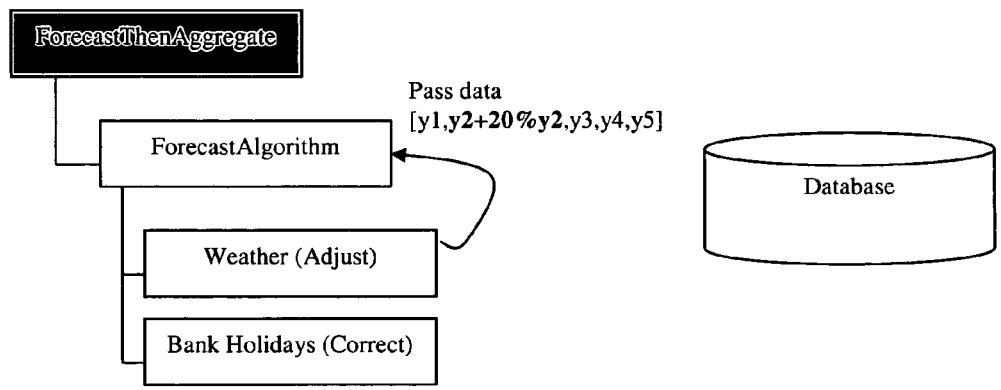

FIG. 17E: The weather adjust algorithm returns adjusted data to the core forecast component, which returns the modified time series.

Figure 17F:
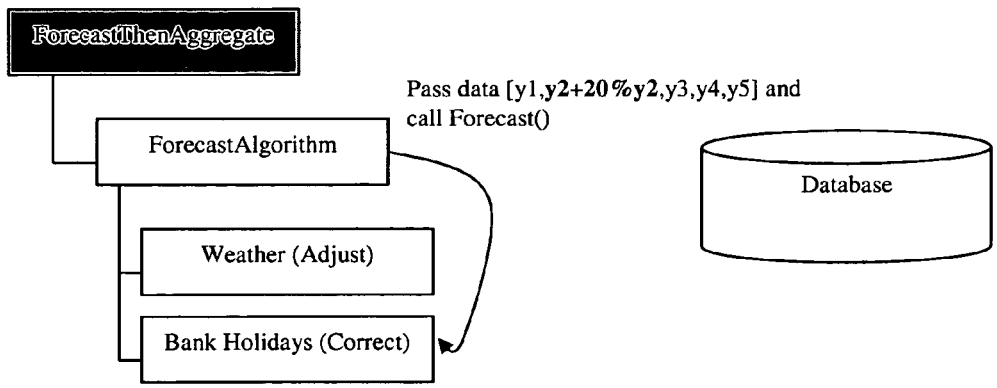

FIG. 17F: The core forecast component invokes the forecast command component on the optional correct forecast algorithm component (e.g., calls Forecast on Correct child). The forecast component passes the time Series (as returned from the weather adjust component) and then invokes the normalise command component on the optional correct forecast algorithm component (e.g., the forecast component passes the time series returned from the adjust component and calls the normalise function on the correct child).

Figure 17G:
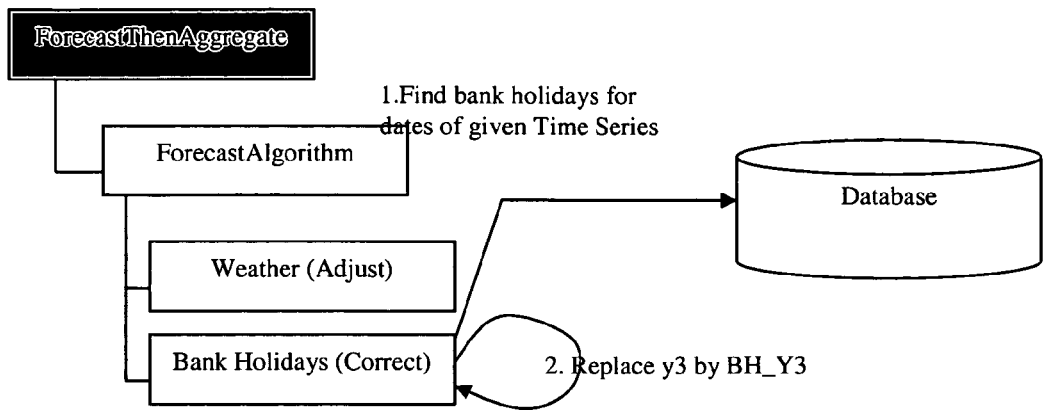

FIG. 17G: Bank Holidays corrects Time Series. The Bank Holidays forecast algorithm component, performs a number of steps: first it reads the database, to replace or correct the existing value(s) of any specific data records identified in accordance with the specific implementation of the Bank Holiday component's rules of operation with the value(s) specified in the implementation of the Bank Holiday component. For example, if on the date of the third value of the passed Time Series, it will be a Bank Holiday, this will be corrected, for example, by adjusting y3 by a BH_Y3 (to impose a bank holiday effect).

Figure 17H:
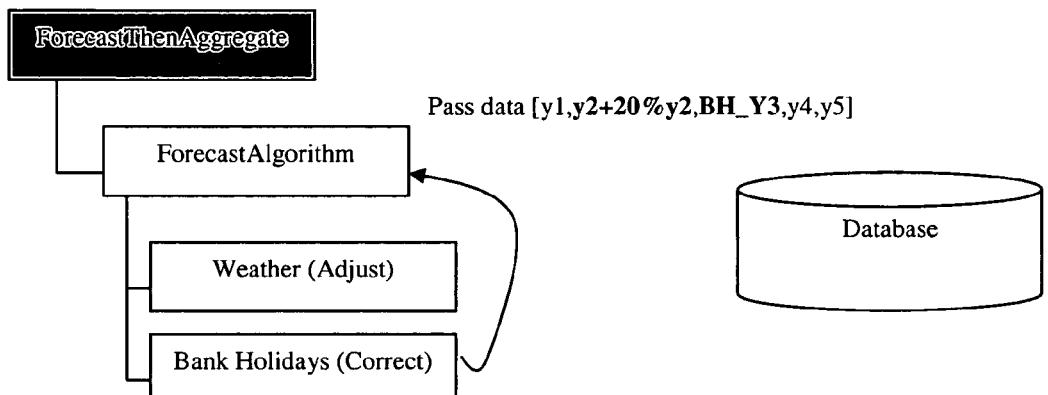

FIG. 17H: Bank Holidays returns the corrected time series data to the core forecast component.

Figure 17I:
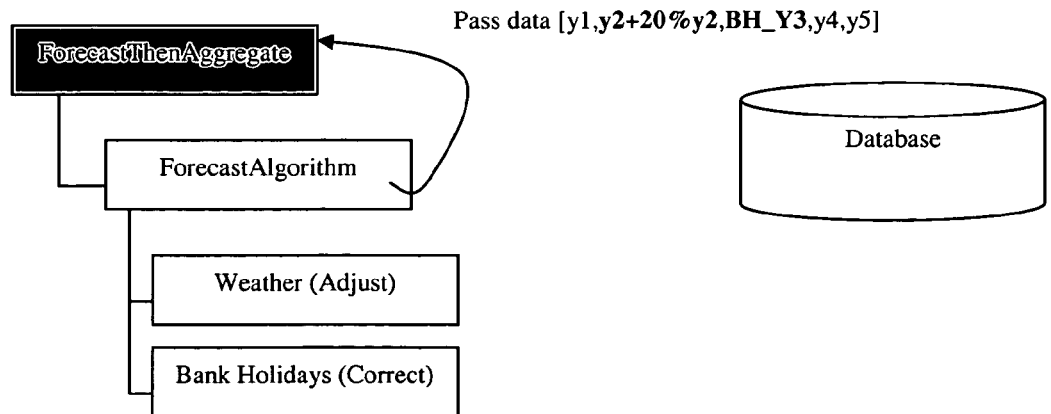

FIG. 17I: The core forecast algorithm operation completes and results are returned to the forecast heuristic component.

Figure 17J:
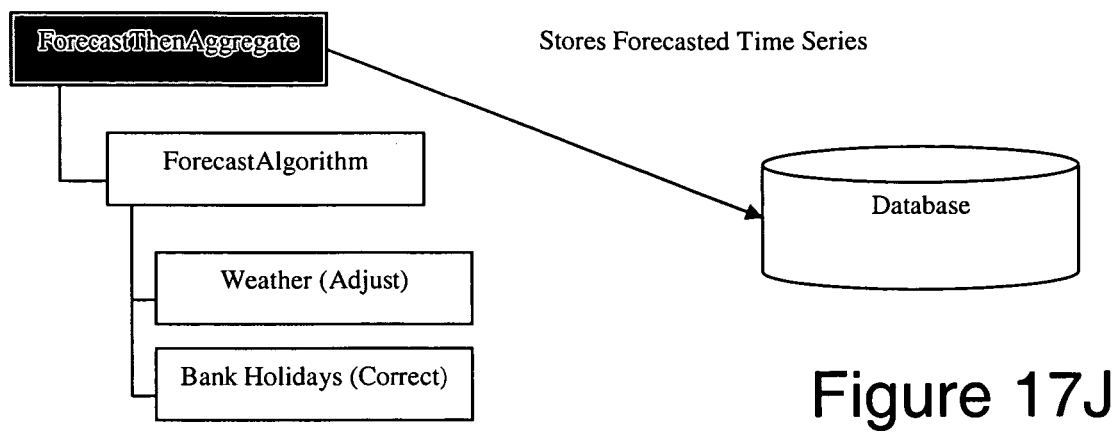

FIG. 17J: The forecast heuristic component stores the forecasted time series in the database and completes its operation.

Those skilled in the art will appreciate that numerous alternative features may be implemented instead of the explicit features referred to above, and that where alternative features functionary equivalent to those described herein are well known to those skilled in the art, the description is intended to implicitly refer to said alternative features. For example, references in the above embodiments to the communications protocols for a specific optional component are not limited to the specific embodiments described but apply generally to any number of equivalent optional components etc.

It will be apparent to those skilled in the art that the invention can be implemented by an appropriate combination of hardware and/or software, and the combination of hard and software is not intended to be limited by the specific partition described hereinabove. Moreover, it is possible for the invention to be implemented by a suite of one or more computer programs running on one or more devices. The devices may be distributed across a communications network.

The text of the abstract is reproduced below as part of the description:

A forecasting engine arranged to generate a forecast for a set of historic time-series data, the engine comprising:

one or more generically structured core algorithmic components providing a core function in a forecasting heuristic algorithm; and one or more generically structured optional algorithmic components providing an optional function in the forecasting heuristic algorithm, wherein each algorithmic component is individually tuned in a predetermined sequence, the first algorithmic component in said sequence performing a tuning process on said set of historic time-series data and subsequent algorithmic components are tuned using time-series data conditioned by all of the tuning processes previously performed in said predetermined sequence, wherein the entire sequence of algorithmic components is arranged to collectively provide conditioned data which is used to generate a forecast.

The invention claimed is:

1. A method of generating a forecast system for generating forecasts of a set of time-series data stored in one or more data stores using a forecast system development tool implemented by one or more computer programs running on one or more devices, the method comprising:

using the tool to:

provide a plurality of functions for a casting heuristic algorithm component using one or more generically structured core forecast algorithm components and one or more user-selected forecast algorithm components, and determine a tuning sequence for said core and user-selected forecast algorithm components by associating said core and user-selected forecast algorithm components with a framework, wherein the structure of the framework determines the tuning sequence for said core and user-selected forecast algorithm components, associating each said core and user-selected forecast algorithm components with a set of one or more rules provided by said forecast heuristic algorithm component, tuning a first forecast algorithm component provided by a first one of said core and user-selected algorithm components in said predetermined tuning sequence determined by said framework using said time-series data to form conditioned time-series data, and tuning subsequent forecast algorithm components in said predetermined tuning sequence using said conditioned time-series data comprising time-series data conditioned by all of the tuning processes previously performed in said predetermined tuning sequence, wherein collectively the sequence of core and user-selected forecast algorithm components determined by the framework and said heuristic forecast component generates said forecast system for generating a forecast of said set of time-series data.

2. The method as claimed in claim 1, wherein the method further comprises the step of:

using the forecast system generating tool to select a forecasting technique which predetermines said forecast heuristic and said framework.

3. A method as claimed in claim 1, wherein said one or more devices comprise a plurality of devices distributed across a communications network.

4. A forecasting system developing tool for developing a forecast system for generating forecasts of a set of time-series data, the tool comprising a forecasting engine and
implemented by one or more computer programs running on one or more devices, the forecasting engine comprising:
one or more generically structured core algorithmic components, each providing a function in a forecasting heuristic algorithm; and
one or more user-selected algorithmic components, each user-selected algorithmic component providing another function in the forecasting heuristic algorithm,
wherein said forecasting engine is arranged to run each of said one or more core algorithmic components and said one or more user-selected algorithmic components individually in a predetermined sequence,
wherein said forecasting engine is further arranged to tune a first ones of said core and user-selected algorithmic components in said sequence on said set of time-series data and to tune subsequent ones of said core and user-selected algorithmic components in said sequence using time-series data conditioned by all of the tuning processes previously performed in said predetermined sequence, and wherein the entire sequence of algorithmic components generates said forecast system and provides conditioned data which said forecast system uses to generate a forecast.

5. A tool as claimed in 4, wherein said core generic algorithmic components provide said forecasting heuristic.

6. A tool as claimed in claim 4, wherein said core generic algorithmic components provide said forecasting heuristic and wherein said forecasting heuristic defines said predetermined sequence.

7. A tool as claimed in claim 4, wherein said core generic algorithmic components provide said forecasting heuristic and wherein said forecasting heuristic determines a level of aggregation for the time-series data, and wherein said forecasting engine generates the forecast at said level of aggregation.

8. A tool as claimed in claim 4, wherein said core generic algorithmic components provide said forecasting heuristic and wherein said forecasting heuristic determines a level of aggregation for the time-series data, and
wherein said forecasting engine generates the forecast at said level of aggregation and wherein said forecast engine receives said time-series data encapsulated within a generic forecast-data-type.

9. A tool as claimed in claim 4, wherein one of said one or more devices comprises:
a display of said forecasting framework, wherein the display comprises a region for a visual representation of the framework and a plurality of forecast algorithm component type regions, each forecast algorithm component type region being arranged to provide a visual display of a type of forecast algorithmic component, wherein each said forecast algorithm component is capable of being incorporated into the displayed framework; and
a selector arranged to enable a user of said design tool to include one or more of said forecast algorithmic components in said forecasting framework by causing said visual representation of
said one or more algorithmic components to be graphically attached to the displayed representation of forecasting framework.

10. A tool as claimed in claim 4, wherein one of said one or more devices comprises:
a display of said forecasting framework, wherein the display comprises a region for a visual representation of the framework and a plurality of forecast algorithm component type regions, each forecast algorithm component type region being arranged to provide a visual display of a type of forecast algorithmic component, wherein each said forecast algorithm component is capable of being incorporated into the displayed framework; and
a selector arranged to enable a user of said design tool to include one or more of said forecast algorithmic components in said forecasting framework by causing said visual representation of said one or more algorithmic components to be graphically attached to the displayed representation of forecasting framework,
wherein the algorithmic components are logically associated by the order in which they are graphically attached to the displayed representation of the forecasting framework.

11. A design tool as claimed in claim 4, wherein one of said one or more devices comprises:
a display of said forecasting framework, wherein the display comprises a region for a visual representation of the framework and a plurality of forecast algorithm component type regions, each forecast algorithm component type region being arranged to provide a visual display of a type of forecast algorithmic component, wherein each said forecast algorithm component is capable of being incorporated into the displayed framework; and
a selector arranged to enable a user of said design tool to include one or more of said forecast algorithmic components in said forecasting framework by causing said visual representation of said one or more algorithmic components to be graphically attached to the displayed representation of forecasting framework,
wherein the algorithmic components are logically associated by the order in which they are graphically attached to the displayed representation of the forecasting framework and wherein the order of the algorithmic components indicates the sequence in which the algorithmic components are tuned.

12. A forecasting system developing tool as claimed in claim 4, wherein said one or more devices comprise a plurality of devices distributed across a communications network.

* * * * *